US009325169B2

(12) United States Patent
Fang et al.

(10) Patent No.: US 9,325,169 B2
(45) Date of Patent: Apr. 26, 2016

(54) TELECOMMUNICATIONS EQUIPMENT, POWER SUPPLY SYSTEM, AND POWER SUPPLY IMPLEMENTATION METHOD

(71) Applicant: HUAWEI TECHNOLOGIES CO., LTD., Shenzhen, Guangdong (CN)

(72) Inventors: Qingyin Fang, Shenzhen (CN); Zhuo Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/726,115

(22) Filed: May 29, 2015

(65) Prior Publication Data
US 2015/0349525 A1    Dec. 3, 2015

(30) Foreign Application Priority Data

May 30, 2014   (CN) .......................... 2014 1 0240310

(51) Int. Cl.
H02J 1/00      (2006.01)
H02J 1/10      (2006.01)
H04M 19/08     (2006.01)

(52) U.S. Cl.
CPC ... H02J 1/00 (2013.01); H02J 1/10 (2013.01); H04M 19/08 (2013.01); Y10T 307/305 (2015.04)

(58) Field of Classification Search
CPC ............. H02J 9/06; H02J 9/061; H02J 9/066; H02J 1/00
USPC ................................... 307/64–66
See application file for complete search history.

(56) References Cited

U.S. PATENT DOCUMENTS

| 5,646,462 | A  | * | 7/1997  | Cortes ...................... H02J 1/10 307/66 |
| 5,920,129 | A  | * | 7/1999  | Smith ..................... H02J 9/061 307/64 |
| 6,281,602 | B1 | * | 8/2001  | Got .......................... H02J 1/06 307/66 |
| 6,304,059 | B1 | * | 10/2001 | Chalasani ............. H02J 7/0018 320/118 |
| 6,630,750 | B2 | * | 10/2003 | McAndrews ............. H02J 1/10 307/64 |
| 8,729,732  | B2 | * | 5/2014  | Fischer .................... H02J 1/10 307/66 |
| 2002/0117899 | A1 | * | 8/2002 | Seefried ................. H02J 9/061 307/64 |
| 2004/0062058 | A1 |   | 4/2004 | Hann et al. |
| 2010/0066170 | A1 |   | 3/2010 | Schuler |

FOREIGN PATENT DOCUMENTS

WO    WO 2005071885 A1    8/2005

* cited by examiner

Primary Examiner — Fritz M Fleming
(74) Attorney, Agent, or Firm — Leydig, Voit & Mayer, Ltd.

(57) ABSTRACT

The present invention provides a telecommunications equipment, a power supply system, and a power supply implementation method. The telecommunications equipment includes at least one fixed power distribution unit, at least one fixed configuration unit, at least one variable power supply unit, and at least one variable configuration unit. The fixed power distribution unit is associated with the fixed configuration unit located in a same section. An input end of each fixed configuration unit of the at least one fixed configuration unit is connected to an output end of a corresponding fixed power distribution unit. Output ends of all the variable power supply units are connected, and an input end of each variable configuration unit of the at least one variable configuration unit is connected to an output end of the variable power supply unit.

19 Claims, 10 Drawing Sheets

TELECOMMUNICATIONS EQUIPMENT, POWER SUPPLY SYSTEM, AND POWER SUPPLY IMPLEMENTATION METHOD

CROSS-REFERENCE

This application claims priority to Chinese Patent Application No. 201410240310.0, filed on May 30, 2014, which is hereby incorporated by reference in its entirety.

TECHNICAL FIELD

The present invention relates to the communications field, and in particular, to a telecommunications equipment, a power supply system, and a power supply implementation method.

BACKGROUND

Inside a conventional telecommunications equipment, a direct current voltage of −48 V or −60 V input from an office equipment room is used to provide power supply to a load in the telecommunications equipment, and a rated power supply current input from the office equipment room is limited, for example, a common rated power supply current is 32 A, 63 A, 80 A, or the like. The load in the telecommunications equipment may include a service board, a cooling fan, or the like. To ensure security of power supply, total power of loads connected to a power supply branch circuit cannot exceed a power supply capability of the power supply branch circuit, where Power supply capability of the power supply branch circuit=Power supply voltage of the branch circuit×Rated power supply current of the branch circuit×Derating coefficient. If the total power of the loads connected to the power supply branch circuit exceeds the power supply capability of the power supply branch circuit, multiple power supply inputs need to be led in from the office equipment room; and correspondingly, multiple power supply branch circuits need to be configured for the telecommunications equipment, and loads included in the telecommunications equipment also need to be sectioned, where one power supply input provides power supply to a load in each section.

For a telecommunications equipment with multiple sections, because there is no restriction on a specific slot into which a customer inserts a service board, generally, power distribution for all sections are already connected during initial configuration, to ensure that a service board can work normally regardless of the slot into which the service board is inserted. In this case, if the number of boards actually configured on the telecommunications equipment by a customer is relatively small, power supply resources provided to the telecommunications equipment by an office equipment room may be seriously wasted. To resolve the problem of a waste of power supply resources, when a telecommunications equipment includes several power supply branch circuits, in the prior art, a power supply unit is configured for each power supply branch circuit of the telecommunications equipment, and the power supply unit performs voltage regulation and conversion and current equalization control on a direct current voltage that is input by each power supply branch circuit; and connects a voltage that is output after conversion by the power supply unit, to form a power supply resource pool. All loads in a communication equipment obtain power from the power supply resource pool, so that sharing of power supply resources is implemented. When a relatively small number of service boards are configured in the telecommunications equipment, the number of power supply branch circuits and the number of corresponding power supply units may be reduced, to reduce a waste of power supply resources.

In the prior art, at least the following problem exists: Before providing power supply to a load in a telecommunications equipment, a power supply voltage led in from an office equipment room needs to be converted by a power supply unit. In this case, when total power of all loads connected to the telecommunications equipment is relatively large, more power supply branch circuits are configured for the telecommunications equipment, and a power supply unit must be configured for each power supply branch circuit, which leads to an increase in the number of power supply units, thereby increasing power supply costs.

SUMMARY

The present invention provides a telecommunications equipment and a power supply implementation method, which resolves both a problem of a waste of power supply resources and a problem of an increase in power supply costs.

A first aspect of the present invention provides a telecommunications equipment, including: at least one fixed power distribution unit, at least one fixed configuration unit, at least one variable power supply unit, and at least one variable configuration unit, where:

the fixed power distribution unit is corresponding to the fixed configuration unit located in a same section, and an input end of each fixed configuration unit of the at least one fixed configuration unit is connected to an output end of a corresponding fixed power distribution unit; and output ends of all the variable power supply units are connected, and an input end of each variable configuration unit of the at least one variable configuration unit is connected to an output end of the variable power supply unit;

the fixed power distribution unit is configured to transmit a power supply voltage to the corresponding fixed configuration unit located in the same section;

the fixed configuration unit includes a first load power supply module and a fixed load, where the first load power supply module is configured to perform processing on a voltage that is output by the fixed power distribution unit, to obtain a voltage required for the fixed load to work normally, and input the voltage required for the fixed load to work normally to the fixed load; and the fixed load is a load that must be configured in the telecommunications equipment;

the variable power supply unit is configured to convert a power supply voltage into a stable direct current voltage; and the variable configuration unit includes a second load power supply module and a variable load, where the second load power supply module is configured to perform processing on the direct current voltage that is output by the variable power supply unit, to obtain a voltage required for the variable load to work normally, and input the voltage required for the variable load to work normally to the variable load; and the variable load is another load, other than the fixed load, that is configured in the telecommunications equipment.

With reference to the first aspect, in a first possible implementation manner, the fixed power distribution unit includes two power distribution subunits, and each of the power distribution subunits includes a first filtering protection module, configured to perform filtering protection processing on the power supply voltage and transmit a voltage after the processing to the corresponding fixed configuration unit located in the same section.

With reference to the first possible implementation manner of the first aspect, in a second possible implementation manner, the power distribution subunit further includes a first ORing module, where an input end of the first ORing module is connected to an output end of the first filtering protection module; and the first ORing module is configured to: when a voltage that is output by the first filtering protection module that belongs to the same power distribution subunit as the first ORing module meets a preset condition, connect a connection between the power distribution subunit and the input end of the corresponding fixed configuration unit located in the same section, to transmit the voltage that is output by the first filtering protection module that belongs to the same power distribution subunit as the first ORing module to the corresponding fixed configuration unit located in the same section, where:

the meeting a preset condition is that a difference between the output voltage of the first filtering protection module that belongs to the same power distribution subunit as the first ORing module and an output voltage of the first filtering protection module that does not belong to the same power distribution subunit as the first ORing module is greater than or equal to a preset threshold; and the preset threshold represents a critical value, which connects the connection between the power distribution subunit and the input end of the corresponding fixed configuration unit located in the same section, of the difference between the output voltage of the first filtering protection module that belongs to the power distribution subunit and the output voltage of the first filtering protection module that does not belong to the power distribution subunit.

With reference to the first aspect, in a third possible implementation manner, the variable power supply unit includes two first power supply subunits, and each of the first power supply subunits includes a second filtering protection module and a direct current converting module, where an output end of the second filtering protection module is connected to an input end of the direct current converting module, and an output end of the direct current converting module is an output end of the variable power supply unit, where:

the second filtering protection module is configured to perform filtering protection processing on a power supply voltage input; and the direct current converting module is configured to convert a voltage that is output by the second filtering protection module into a stable direct current voltage.

With reference to the third possible implementation manner of the first aspect, in a fourth possible implementation manner, there are N variable power supply units, a sum of rated power of all the variable loads is P, and rated output power of the first power supply subunit is Q; when P/Q is an integer, N=P/Q; and when P/Q is not an integer, N=floor(P/Q)+1.

With reference to the first aspect, in a fifth possible implementation manner, the variable power supply unit includes a first power supply subunit, and the first power supply subunit includes a third filtering protection module, a second ORing module, and a direct current converting module, where an output end of the third filtering protection module is connected to an input end of the second ORing module, an output end of the second ORing module is connected to an input end of the direct current converting module, and an output end of the direct current converting module is an output end of the variable power supply unit, where:

the third filtering protection module is configured to perform filtering protection processing on two power supply voltage inputs;

the second ORing module is configured to convert two voltage inputs that are output by the third filtering protection module into one voltage input, and output the one voltage input; and the direct current converting module is configured to convert a voltage that is output by the second ORing module into a stable direct current voltage.

With reference to the fifth possible implementation manner of the first aspect, in a sixth possible implementation manner, there are N+m variable power supply units, a sum of rated power of all the variable loads is P, and rated output power of the first power supply subunit is Q; when P/Q is an integer, N=P/Q; and when P/Q is not an integer, N=floor(P/Q)+1, where m is an integer greater than or equal to 0 and less than or equal to N; and the m variable power supply units of the N+m variable power supply units are backup power supply units of the N variable power supply units.

With reference to the first aspect and any one of the first possible implementation manner to the sixth possible implementation manner of the first aspect, in a seventh possible implementation manner, the telecommunications equipment further includes: a first power supply reporting module, a second power supply reporting module, and a centralized management unit, where:

the first power supply reporting module is configured to acquire output power of the fixed power distribution unit, and report the output power of the fixed power distribution unit to the centralized management unit; and the second power supply reporting module is configured to acquire output power of the variable power supply unit and report the output power of the variable power supply unit to the centralized management unit;

the fixed configuration unit further includes a first load monitoring module, configured to monitor rated power of the fixed load and report the rated power of the fixed load to the centralized management unit; and a first selection module, where an input end of the first selection module is separately connected to the output end of the fixed power distribution unit and the output end of the variable power supply unit, an output end of the first selection module is connected to an input end of the first load power supply module, and the first selection module is connected to the first load monitoring module; and the first selection module is configured to select, from an output voltage of the fixed power distribution unit and an output voltage of the variable power supply unit according to a control operation of the first load monitoring module, a voltage input as an input voltage of the fixed configuration unit;

the variable configuration unit further includes a second load monitoring module, configured to monitor rated power of the variable load and report the rated power of the variable load to the centralized management unit;

the centralized management unit is configured to determine a first trigger instruction according to the output power of the fixed power distribution unit, the output power of the variable power supply unit, the rated power of the fixed load, and the rated power of the variable load, and transmit the first trigger instruction to the first load monitoring module, where the first trigger instruction is used to instruct the first load monitoring module to control the first selection module to select, from the output voltage of the fixed power distribution unit and the output voltage of the variable power supply unit, the output voltage of the fixed power distribution unit or the output voltage of the variable power supply unit as the input voltage of the fixed configuration unit, where:

when there is a surplus of the output power of the fixed power distribution unit, the first trigger instruction is used to instruct the first load monitoring module to control the first selection module to select the output voltage of the fixed power distribution unit as the input voltage of the fixed configuration unit; or when there is a surplus of the output power of the variable power supply unit, the first trigger instruction is used to instruct the first load monitoring module to control the first selection module to select the output voltage of the variable power supply unit as the input voltage of the fixed configuration unit; or when there is a surplus of both the output power of the fixed power distribution unit and the output power of the variable power supply unit, the first trigger instruction is used to instruct the first load monitoring module to control the first selection module to preferably select the output voltage of the fixed power distribution unit as the input voltage of the fixed configuration unit.

With reference to the seventh possible implementation manner of the first aspect, in an eighth possible implementation manner, when a sum of rated power of all fixed loads corresponding to the fixed power distribution unit located in the same section is less than or equal to the output power of the fixed power distribution unit, the first trigger instruction is used to instruct the first load monitoring module to control the first selection module to select, from the output voltage of the fixed power distribution unit and the output voltage of the variable power supply unit, the output voltage of the fixed power distribution unit as the input voltage of the fixed configuration unit; or when a sum of rated power of all fixed loads corresponding to the fixed power distribution unit located in the same section is greater than the output power of the fixed power distribution unit, and a sum of output power of all the variable power supply units is greater than or equal to a sum of rated power of all the variable loads and the rated power of all the fixed loads; or when a sum of output power of all the variable power supply units is greater than or equal to a sum of rated power of all the variable loads and the rated power of all the fixed loads, the first trigger instruction is used to instruct the first load monitoring module to control the first selection module to select, from the output voltage of the fixed power distribution unit and the output voltage of the variable power supply unit, the output voltage of the variable power supply unit as the input voltage of the fixed configuration unit; or when a sum of rated power of all fixed loads corresponding to the fixed power distribution unit located in the same section is less than or equal to the output power of the fixed power distribution unit, and a sum of output power of all the variable power supply units is greater than or equal to a sum of rated power of all the variable loads and the rated power of all the fixed loads, the first trigger instruction is used to instruct the first load monitoring module to control the first selection module to preferably select, from the output voltage of the fixed power distribution unit and the output voltage of the variable power supply unit, the output voltage of the fixed power distribution unit as the input voltage of the fixed configuration unit.

With reference to the first aspect, and any one of the first possible implementation manner to the sixth possible implementation manner of the first aspect, in a ninth possible implementation manner, the telecommunications equipment further includes: a first power supply reporting module, a second power supply reporting module, and a centralized management unit, where:

the first power supply reporting module is configured to acquire output power of the fixed power distribution unit, and report the output power of the fixed power distribution unit to the centralized management unit; and the second power supply reporting module is configured to acquire output power of the variable power supply unit and report the output power of the variable power supply unit to the centralized management unit;

the fixed configuration unit further includes a first load monitoring module, configured to monitor rated power of the fixed load and report the rated power of the fixed load to the centralized management unit;

the variable configuration unit further includes a second load monitoring module, configured to monitor rated power of the variable load and report the rated power of the variable load to the centralized management unit; and a second selection module, where an input end of the second selection module is separately connected to the output end of the fixed power distribution unit and the output end of the variable power supply unit, an output end of the second selection module is connected to an input end of the second load power supply module, and the second selection module is connected to the second load monitoring module; and the second selection module is configured to select, from an output voltage of the fixed power distribution unit and an output voltage of the variable power supply unit according to a control operation of the second load monitoring module, a voltage input as an input voltage of the variable configuration unit;

the centralized management unit is configured to determine a second trigger instruction according to the output power of the fixed power distribution unit, the output power of the variable power supply unit, the rated power of the fixed load, and the rated power of the variable load, and transmit the second trigger instruction to the second load monitoring module, where the second trigger instruction is used to instruct the second load monitoring module to control the second selection module to select, from the output voltage of the fixed power distribution unit and the output voltage of the variable power supply unit, the output voltage of the fixed power distribution unit or the output voltage of the variable power supply unit as the input voltage of the variable configuration unit, where:

when there is a surplus of the output power of the fixed power distribution unit, the second trigger instruction is used to instruct the second load monitoring module to control the second selection module to select the output voltage of the fixed power distribution unit as the input voltage of the variable configuration unit; or when there is a surplus of the output power of the variable power supply unit, the second trigger instruction is used to instruct the second load monitoring module to control the second selection module to select the output voltage of the variable power supply unit as the input voltage of the variable configuration unit; or when there is a surplus of both the output power of the fixed power distribution unit and the output power of the variable power supply unit, the second trigger instruction is used to instruct the second load monitoring module to control the second selection module to preferably select the output voltage of the fixed power distribution unit as the input voltage of the variable configuration unit.

With reference to the ninth possible implementation manner of the first aspect, in a tenth possible implementation manner, when a difference between the output power of the fixed power distribution unit and a sum of rated power of all the fixed loads corresponding to the fixed power distribution unit located in the same section is greater than zero, and the difference is greater than or equal to the rated power of the variable load, the second trigger instruction is used to instruct the second load monitoring module to control the second selection module to select, from the output voltage of the fixed power distribution unit and the output voltage of the variable power supply unit, the output voltage of the fixed power distribution unit as the input voltage of the variable configuration unit; or when a difference between the output power of the fixed power distribution unit and a sum of rated power of all the fixed loads corresponding to the fixed power distribution unit located in the same section is greater than zero, the difference is less than the rated power of the variable load, and a sum of output power of all the variable power supply units is greater than or equal to a sum of rated power of all the variable loads; or when differences between output power of each fixed power distribution unit of the at least one fixed power distribution unit included in the telecommunications equipment and the sum of the rated power of all the fixed loads corresponding to the fixed power distribution unit located in the same section are all equal to zero, and a sum of output power of all the variable power supply units is greater than or equal to a sum of rated power of all the variable loads; or when a sum of output power of all the variable power supply units is greater than or equal to a sum of rated power of all the variable loads, the second trigger instruction is used to instruct the second load monitoring module to control the second selection module to select, from the output voltage of the fixed power distribution unit and the output voltage of the variable power supply unit, the output voltage of the variable power distribution unit as the input voltage of the variable configuration unit; or when a difference between the output power of the fixed power distribution unit and a sum of rated power of all the fixed loads corresponding to the fixed power distribution unit located in the same section is greater than zero, the difference is greater than or equal to the rated power of the variable load, and a sum of output power of all the variable power supply units is greater than or equal to a sum of rated power of all the variable loads, the second trigger instruction is used to instruct the second load monitoring module to control the second selection module to preferably select, from the output voltage of the fixed power distribution unit and the output voltage of the variable power supply unit, the output voltage of the fixed power distribution unit as the input voltage of the variable configuration unit.

A second aspect of the present invention provides a power supply system, including:

an equipment room and a telecommunications equipment, where:

the equipment room is configured to input a power supply voltage to the telecommunications equipment; and the telecommunications equipment includes at least one fixed power distribution unit, at least one fixed configuration unit, at least one variable power supply unit, and at least one variable configuration unit, where the fixed power distribution unit is corresponding to the fixed configuration unit located in a same section, and an input end of each fixed configuration unit of the at least one fixed configuration unit is connected to an output end of a corresponding fixed power distribution unit; and output ends of all the variable power supply units are connected, and an input end of each variable configuration unit of the at least one variable configuration unit is connected to an output end of the variable power supply unit; where:

the fixed power distribution unit is configured to transmit a power supply voltage to the corresponding fixed configuration unit located in the same section;

the fixed configuration unit includes a first load power supply module and a fixed load, where the first load power supply module is configured to perform processing on a voltage that is output by the fixed power distribution unit, to obtain a voltage required for the fixed load to work normally, and input the voltage required for the fixed load to work normally to the fixed load; and the fixed load is a load that must be configured in the telecommunications equipment;

the variable power supply unit is configured to convert a power supply voltage into a stable direct current voltage; and the variable configuration unit includes a second load power supply module and a variable load, where the second load power supply module is configured to perform processing on the direct current voltage that is output by the variable power supply unit, to obtain a voltage required for the variable load to work normally, and input the voltage required for the variable load to work normally to the variable load; and the variable load is another load, other than the fixed load, that is configured in the telecommunications equipment.

A third aspect of the present invention provides a power supply implementation method, which is applied to a telecommunications equipment, where the telecommunications equipment includes at least one fixed power distribution unit, at least one fixed configuration unit, at least one variable power supply unit, and at least one variable configuration unit, where the fixed power distribution unit is corresponding to the fixed configuration unit located in a same section, and an input end of each fixed configuration unit of the at least one fixed configuration unit is connected to an output end of a corresponding fixed power distribution unit; output ends of all the variable power supply units are connected, and an input end of each variable configuration unit of the at least one variable configuration unit is connected to an output end of the variable power supply unit; the fixed configuration unit includes a first load power supply module and a fixed load; and the variable configuration unit includes a second load power supply module and a variable load; and the method includes:

transmitting, by the fixed power distribution unit, a power supply voltage to the corresponding fixed configuration unit located in the same section;

performing, by the first load power supply module, processing on a voltage that is output by the fixed power distribution unit, to obtain a voltage required for the fixed load to work normally, and inputting the voltage required for the fixed load to work normally to the fixed load, where the fixed load is a load that must be configured in the telecommunications equipment;

converting, by the variable power supply unit, a power supply voltage into a stable direct current voltage; and performing, by the second load power supply module, processing on the direct current voltage that is output by the variable power supply unit, to obtain a voltage required for the variable load to work normally, and inputting the voltage required for the variable load to work normally to the variable load, where the variable load is another load, other than the fixed load, that is configured in the telecommunications equipment.

With reference to the third aspect, in a first possible implementation manner, the fixed power distribution unit includes two power distribution subunits, and each of the power distribution subunits includes a first filtering protection module; and the transmitting, by the fixed power distribution unit, a power supply voltage to the corresponding fixed configuration unit located in the same section includes:

performing, by the first filtering protection module, filtering protection processing on the power supply voltage, and transmitting a voltage after the processing to the corresponding fixed configuration unit located in the same section.

With reference to the first possible implementation manner of the third aspect, in a second possible implementation manner, the power distribution subunit further includes a first ORing module, where an input end of the first ORing module is connected to an output end of the first filtering protection module; and when a voltage that is output by the first filtering protection module that belongs to the same power distribution subunit as the first ORing module meets a preset condition, the first ORing module connects a connection between the power distribution subunit and the input end of the corresponding fixed configuration unit located in the same section, to transmit the voltage that is output by the first filtering protection module that belongs to the same power distribution subunit as the first ORing module to the corresponding fixed configuration unit located in the same section, where:

the meeting a preset condition is that a difference between the output voltage of the first filtering protection module that belongs to the same power distribution subunit as the first ORing module and an output voltage of the first filtering protection module that does not belong to the same power distribution subunit as the first ORing module is greater than or equal to a preset threshold; and the preset threshold represents a critical value, which connects the connection between the power distribution subunit and the input end of the corresponding fixed configuration unit located in the same section, of the difference between the output voltage of the first filtering protection module that belongs to the power distribution subunit and the output voltage of the first filtering protection module that does not belong to the power distribution subunit.

With reference to the third aspect, in a third possible implementation manner, the variable power supply unit includes two first power supply subunits, and each of the first power supply subunits includes a second filtering protection module and a direct current converting module, where an output end of the second filtering protection module is connected to an input end of the direct current converting module, and an output end of the direct current converting module is an output end of the variable power supply unit; and the converting, by the variable power supply unit, a power supply voltage into a stable direct current voltage includes:

performing, by the second filtering protection module, filtering protection processing on a power supply voltage input; and converting, by the direct current converting module, a voltage that is output by the second filtering protection module into a stable direct current voltage.

With reference to the third aspect, in a fourth possible implementation manner, the variable power supply unit includes a first power supply subunit, and the first power supply subunit includes a third filtering protection module, a second ORing module, and a direct current converting module, where an output end of the third filtering protection module is connected to an input end of the second ORing module, an output end of the second ORing module is connected to an input end of the direct current converting module, and an output end of the direct current converting module is an output end of the variable power supply unit; and the converting, by the variable power supply unit, a power supply voltage into a stable direct current voltage includes:

performing, by the third filtering protection module, filtering protection processing on two power supply voltage inputs;

converting, by the second ORing module, two voltage inputs that are output by the third filtering protection module into one voltage input, and outputting the one voltage input; and converting, by the direct current converting module, a voltage that is output by the second ORing module into a stable direct current voltage.

With reference to the third aspect, and any one of the first possible implementation manner to the fourth possible implementation manner, in a fifth possible implementation manner, the telecommunications equipment further includes a first power supply reporting module, a second power supply reporting module, and a centralized management unit; the fixed configuration unit further includes a first load monitoring module and a first selection module; and the variable configuration unit further includes a second load monitoring module, where an input end of the first selection module is separately connected to the output end of the fixed power distribution unit and the output end of the variable power supply unit, an output end of the first selection module is connected to an input end of the first load power supply module, and the first selection module is connected to the first load monitoring module; and the method further includes:

acquiring, by the first power supply reporting module, output power of the fixed power distribution unit, and reporting the output power of the fixed power distribution unit to the centralized management unit;

acquiring, by the second power supply reporting module, output power of the variable power supply unit, and reporting the output power of the variable power supply unit to the centralized management unit;

monitoring, by the first load monitoring module, rated power of the fixed load, and reporting the rated power of the fixed load to the centralized management unit;

selecting, by the first selection module from an output voltage of the fixed power distribution unit and an output voltage of the variable power supply unit according to a control operation of the first load monitoring module, a voltage input as an input voltage of the fixed configuration unit;

monitoring, by the second load monitoring module, rated power of the variable load, and reporting the rated power of the variable load to the centralized management unit; and determining, by the centralized management unit according to the output power of the fixed power distribution unit, the output power of the variable power supply unit, the rated power of the fixed load, and the rated power of the variable load, a first trigger instruction; and transmitting the first trigger instruction to the first load monitoring module, where the first trigger instruction is used to instruct the first load monitoring module to control the first selection module to select, from the output voltage of the fixed power distribution unit and the output voltage of the variable power supply unit, the output voltage of the fixed power distribution unit or the output voltage of the variable power supply unit as the input voltage of the fixed configuration unit, where:

when there is a surplus of the output power of the fixed power distribution unit, the first trigger instruction is used to instruct the first load monitoring module to control the first selection module to select the output voltage of the fixed power distribution unit as the input voltage of the fixed configuration unit; or when there is a surplus of the output power of the variable power supply unit, the first trigger instruction is used to instruct the first load monitoring module to control the first selection module to select the output voltage of the variable power supply unit as the input voltage of the fixed configuration unit; or when there is a surplus of both the output power of the fixed power distribution unit and the output power of the variable power supply unit, the first trigger instruction is used to instruct the first load monitoring module to control the first selection module to preferably select the output voltage of the fixed power distribution unit as the input voltage of the fixed configuration unit.

With reference to the third aspect, and any one of the first possible implementation manner to the fourth possible implementation manner, in a sixth possible implementation manner, the telecommunications equipment further includes: a first power supply reporting module, a second power supply reporting module, and a centralized management unit; the fixed configuration unit further includes a first load monitoring module; and the variable configuration unit further includes a second load monitoring module and a second selection module, where an input end of the second selection module is separately connected to the output end of the fixed power distribution unit and the output end of the variable power supply unit, an output end of the second selection module is connected to an input end of the second load power supply module, and the second selection module is connected to the second load monitoring module; and the method further includes:

acquiring, by the first power supply reporting module, output power of the fixed power distribution unit, and reporting the output power of the fixed power distribution unit to the centralized management unit;

acquiring, by the second power supply reporting module, output power of the variable power supply unit, and reporting the output power of the variable power supply unit to the centralized management unit;

monitoring, by the second load monitoring module, rated power of the variable load, and reporting the rated power of the variable load to the centralized management unit;

selecting, by the second selection module from an output voltage of the fixed power distribution unit and an output voltage of the variable power supply unit according to a control operation of the second load monitoring module, a voltage input as an input voltage of the variable configuration unit;

monitoring, by the first load monitoring module, rated power of the fixed load, and reporting the rated power of the fixed load to the centralized management unit; and determining, by the centralized management unit according to the output power of the fixed power distribution unit, the output power of the variable power supply unit, the rated power of the fixed load, and the rated power of the variable load, a second trigger instruction, and transmitting the second trigger instruction to the second load monitoring module, where the second trigger instruction is used to instruct the second load monitoring module to control the second selection module to select, from the output voltage of the fixed power distribution unit and the output voltage of the variable power supply unit, the output voltage of the fixed power distribution unit or the output voltage of the variable power supply unit as the input voltage of the variable configuration unit, where:

when there is a surplus of the output power of the fixed power distribution unit, the second trigger instruction is used to instruct the second load monitoring module to control the second selection module to select the output voltage of the fixed power distribution unit as the input voltage of the variable configuration unit; or when there is a surplus of the output power of the variable power supply unit, the second trigger instruction is used to instruct the second load monitoring module to control the second selection module to select the output voltage of the variable power supply unit as the input voltage of the variable configuration unit; or when there is a surplus of both the output power of the fixed power distribution unit and the output power of the variable power supply unit, the second trigger instruction is used to instruct the second load monitoring module to control the second selection module to preferably select the output voltage of the fixed power distribution unit as the input voltage of the variable configuration unit.

The embodiments of the present invention provides a telecommunications equipment, a power supply system, and a power supply implementation method, where the telecommunications equipment includes at least one fixed power distribution unit, at least one fixed configuration unit, at least one variable power supply unit, and at least one variable configuration unit. All loads are differentiated, the fixed power distribution unit provides power supply to a load that must be configured in the telecommunications equipment, and the variable power supply unit provides power supply to another load, other than a fixed load, that is configured in the telecommunications equipment. This not only avoids a problem of a waste of resources, which is caused when only the fixed power distribution unit is used to provide power supply to all the loads and power distribution of all the loads needs to be connected during initial configuration, but also avoids a problem of an increase in power supply costs, which is caused when only the variable power supply unit is used to provide power supply to all the loads and a power supply unit needs to be configured for each power supply voltage input to provide power supply to all the loads, that is, the telecommunications equipment provided in the present invention improves utilization of a power supply resource, and reduces power supply costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
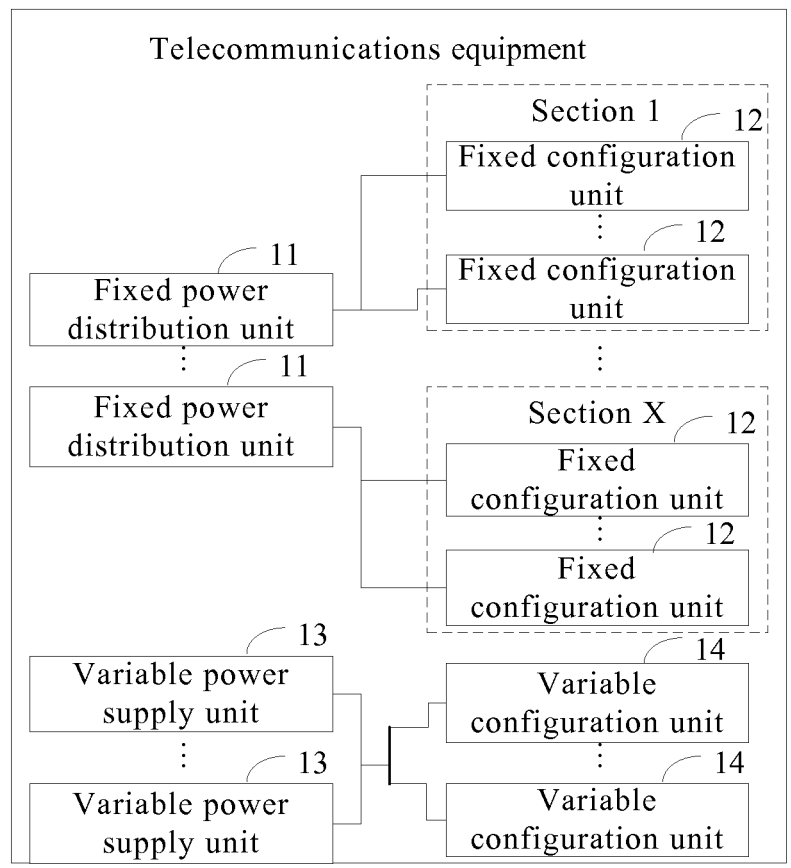
FIG. 1 is a schematic diagram of composition of a telecommunications equipment according to Embodiment 1 of the present invention.

Embodiment 1 of the present invention provides a telecommunications equipment. As shown in FIG. 1, the telecommunications equipment may include: at least one fixed power distribution unit 11, at least one fixed configuration unit 12, at least one variable power supply unit 13, and at least one variable configuration unit 14.

The fixed power distribution unit 11 is corresponding to the fixed configuration unit 12 located in a same section, and an input end of each fixed configuration unit 12 of the at least one fixed configuration unit 12 is connected to an output end of a corresponding fixed power distribution unit 11; and output ends of all the variable power supply units 13 are connected, and an input end of each variable configuration unit 14 of the at least one variable configuration unit 14 is connected to an output end of the variable power supply unit 13.

The fixed power distribution unit 11 is configured to transmit a power supply voltage to the corresponding fixed configuration unit 12 located in the same section.

It should be noted that, in this embodiment of the present invention, an equipment room may provide a power supply voltage to the fixed power distribution unit 11 in the telecommunications equipment, and this embodiment of the present invention does not set a limitation herein to a specific device that provides a power supply voltage to the telecommunications equipment.

Further optionally, for example, when an equipment room provides a power supply voltage to the fixed power distribution unit 11 in the telecommunications equipment, the fixed power distribution unit 11 may be further configured to perform filtering protection processing on a power supply voltage of −48 V or −60 V input by the equipment room, and input a voltage after the processing to the fixed configuration unit 12 located in the same section, to provide power supply to the fixed configuration unit 12. By performing the filtering protection processing on the power supply voltage that is input by the equipment room, the fixed power distribution unit 11 can filter out an interfering signal, thereby effectively preventing interference to the telecommunications equipment from a signal outside the telecommunications equipment; and when the telecommunications equipment is struck by lightning, with the filtering protection processing performed by the fixed power distribution unit 11, a residual voltage caused by lightning may not exceed a range of voltage that can be borne by the telecommunications equipment, to implement protection of the telecommunications equipment. In addition, the fixed power distribution unit 11 may also prevent interference generated inside the telecommunications equipment from leaking out of the telecommunications equipment.

Figure 2:
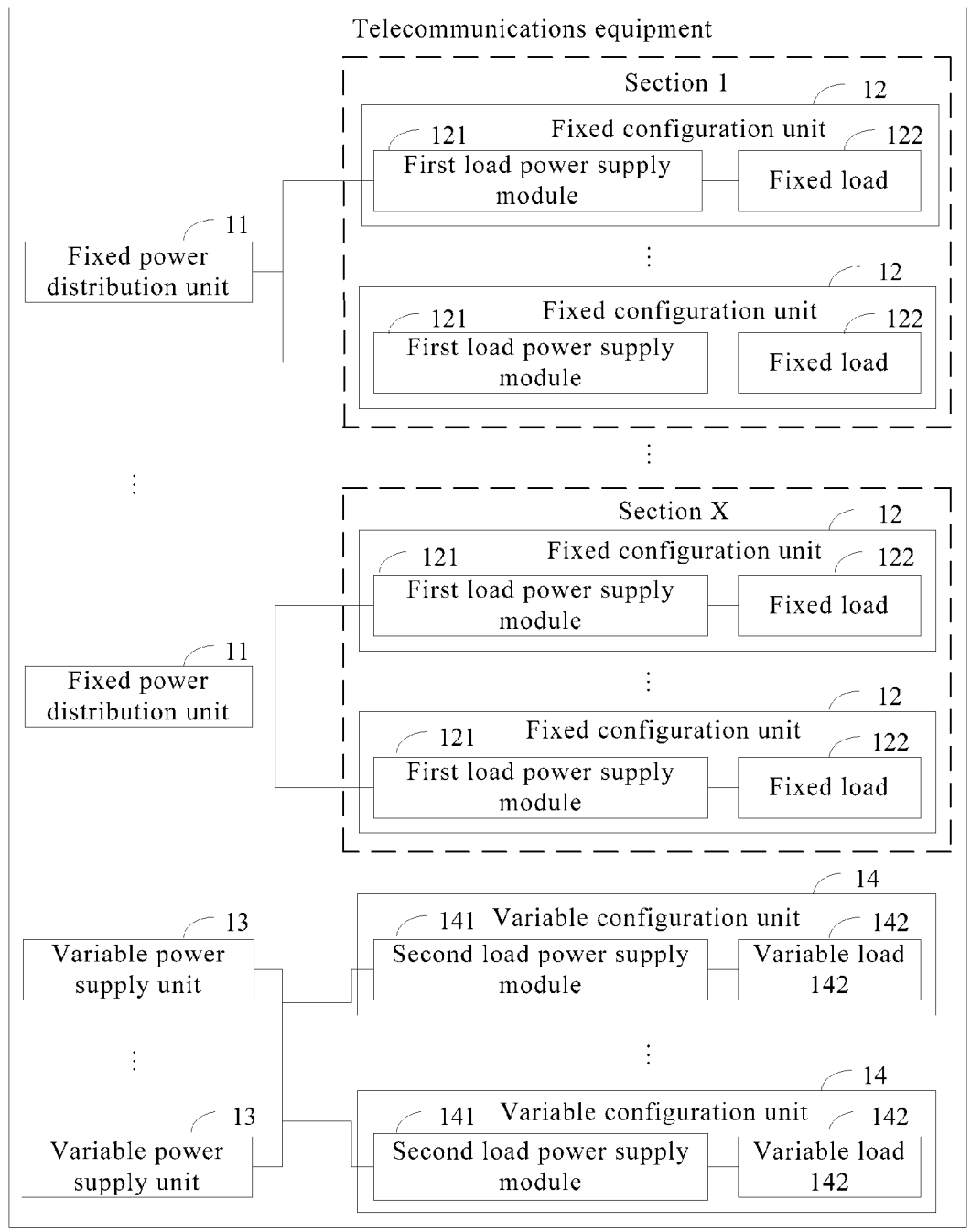
FIG. 2 is a schematic diagram of composition of another telecommunications equipment according to Embodiment 1 of the present invention.

As shown in FIG. 2, each fixed configuration unit 12 of the at least one fixed configuration unit 12 included in the telecommunications equipment may include: a first load power supply module 121 and a fixed load 122, where the first load power supply module 121 is configured to perform processing on a voltage that is output by the fixed power distribution unit 11, to obtain a voltage required for the fixed load 122 to work normally, and input the voltage required for the fixed load 122 to work normally to the fixed load 122.

Specifically, an input end of the first load power supply module 121 is an input end of the fixed configuration unit 12, that is, the input end of the first load power supply module 121 is connected to the output end of the corresponding fixed power distribution unit 11; and the first load power supply module 121 is configured to perform soft-start, filtering, and voltage regulation processing on the voltage that is output by the corresponding fixed power distribution unit 11, to obtain the voltage required for the fixed load 122 to work normally, thereby preventing the fixed load 122 from being damaged during hot swapping.

The fixed load 122 is a load that must be configured in the telecommunications equipment, and configuration of these loads does not vary according to different deployed services or different application scenarios of the telecommunications equipment. That is, the loads configured in the telecommunications equipment, for example, a board, a cooling fan, or the like that must be configured in all application scenarios, are definite. Therefore, in different application scenarios, rated power of these fixed loads 122 is constant, and a sum of rated power of all fixed loads 122 included in the telecommunications equipment is also constant. In this case, when an equipment room provides a power supply voltage to the fixed power distribution unit 11 in the telecommunications equipment, the number of power supply inputs that need to be provided by the equipment room and a power supply capability of each power supply branch circuit may be determined in advance according to the sum of the rated power of all the fixed loads 122 that need to be included in the telecommunications equipment; and then, the number of power supply sections into which all the fixed loads 122 need to be divided and the number of fixed loads 122 included in each power supply section are determined according to the number of power supply inputs that need to be provided by the equipment room and the power supply capability of each power supply branch circuit, and a sum of rated power of all the fixed loads 122 included in each power supply section is less than or equal to a power supply capability of a corresponding fixed power distribution unit 11. A same fixed power distribution unit 11 provides power supply to all fixed loads 122 included in a power supply section; and because all these fixed loads 122 must be configured inside the telecommunications equipment, it can be ensured that a power supply resource provided by each power supply branch circuit is not wasted.

It can be known from the above that, in this embodiment of the present invention, for the load (that is, the fixed load 122) that must be configured in the telecommunications equipment, the corresponding fixed power distribution unit 11 provides power supply to the load. Specifically: the fixed power distribution unit 11 transmits the power supply voltage to the first load power supply module 121 in the fixed configuration unit 12, and the first load power supply module 121 may perform soft-start, filtering, and voltage regulation processing to obtain a voltage required for the fixed load 122 to work normally, and input the voltage required for the fixed load 122 to work normally to the fixed load 122, so that the fixed load 122 can work normally.

The variable power supply unit 13 is configured to convert a power supply voltage into a stable direct current voltage.

It should be noted that, in this embodiment of the present invention, an equipment room may provide a power supply voltage to the variable power supply unit 13 in the telecommunications equipment, and this embodiment of the present invention does not set a limitation herein to a specific device that provides a power supply voltage to the telecommunications equipment.

Specifically, for example, when an equipment room provides a power supply voltage to the variable power supply unit 13 in the telecommunications equipment, the variable power supply unit 13 may convert the power supply voltage that is input by the equipment room into a stable direct current voltage; and the output ends of all the variable power supply units 13 included in the telecommunications equipment are connected. Therefore, voltages processed by all the variable power supply units 13 can form a stable voltage resource pool, to provide power supply to the variable configuration unit 14. Further optionally, the variable power supply unit 13 may further perform filtering protection processing on the power supply voltage that is input by the equipment room, and can also filter out an interfering signal, thereby effectively preventing interference to the telecommunications equipment from a signal outside the telecommunications equipment; and when the telecommunications equipment is struck by lightning, with the filtering protection processing performed by the variable power supply unit 13, a residual voltage caused by lightning may not exceed a range of voltage that can be borne by the telecommunications equipment, to implement protection of the telecommunications equipment. In addition, the variable power supply unit 13 may also prevent interference generated inside the telecommunications equipment from leaking out of the telecommunications equipment.

As shown in FIG. 2, each variable configuration unit 14 of the at least one variable configuration unit 14 included in the telecommunications equipment includes: a second load power supply module 141 and a variable load 142, where the second load power supply module 141 is configured to perform processing on the direct current voltage that is output by the variable power supply unit 13, to obtain a voltage required for the variable load 142 to work normally, and input the voltage required for the variable load 142 to work normally to the variable load 142.

Specifically, an input end of the second load power supply module 141 is the input end of the variable configuration unit 14, that is, the input end of the second load power supply module 141 is connected to the output end of the variable power supply unit 13; and the second load power supply module 141 is configured to perform soft-start, filtering, and voltage regulation processing on the voltage that is output by the variable power supply unit 13, to obtain the voltage required for the variable load 142 to work normally, thereby preventing the variable load 142 from damage during hot swapping.

The variable load 142 is another load, other than the fixed load, that is configured in the telecommunications equipment; and configuration of these loads varies according to different deployed services and different application scenarios of the telecommunications equipment. Therefore, in different application scenarios, rated power and the number of variable loads 142 may change according to different deployed services and different application scenarios of the telecommunications equipment, that is, a sum of rated power of variable loads 142 included in all variable configuration units 14 may change. For example, for a service interface board in the telecommunications equipment, when deployed services are different, both types and the number of service interface boards that need to be installed in the telecommunications equipment are different. Because the rated power of these variable loads 142 may change relatively greatly due to different application scenarios and different deployed services of the telecommunications equipment, in this embodiment of the present invention, a direct current voltage obtained after the variable power supply unit 13 performs voltage regulation on a power supply voltage is used to provide power supply to the variable loads 142.

It can be know from the above that, in this embodiment of the present invention, for the variable load 142, the variable power supply unit 13 provides power supply to the variable load 142. Specifically: the variable power supply unit 13 performs voltage regulation on the power supply voltage, and inputs a direct current voltage obtained after the processing to the second load power supply module 141 in the variable configuration unit 14; and the second load power supply module 141 performs soft-start, filtering, and voltage regulation processing to obtain a voltage required for the variable load 142 to work normally, and then input the voltage required for the variable load 142 to work normally to the variable load 142, so that the variable load 142 can work normally.

It should be noted that, in the telecommunications equipment shown in FIG. 1 and FIG. 2 provided in this embodiment of the present invention, the numbers of the fixed power distribution units 11, the fixed configuration units 12, the variable power supply units 13, and the variable configuration units 14 that are shown are merely intended for ease of understanding for a person skilled in the art, but do not set a specific limitation to the numbers of fixed power distribution units 11, fixed configuration units 12, variable power supply units 13, and variable configuration units 14 included in the telecommunications equipment. The numbers of the fixed power distribution units 11, the fixed configuration units 12, the variable power supply units 13, and the variable configuration units 14 that need to be included in the telecommunications equipment may be configured according to a requirement of an actual application scenario, and this embodiment of the present invention and the accompanying drawings provided in this embodiment of the present invention do not set a specific limitation to the numbers of the fixed power distribution units 11, the fixed configuration units 12, the variable power supply units 13, and the variable configuration units 14 that need to be included in the telecommunications equipment.

This embodiment of the present invention provides a telecommunications equipment, where the telecommunications equipment includes at least one fixed power distribution unit, at least one fixed configuration unit, at least one variable power supply unit, and at least one variable configuration unit. All loads are differentiated, the fixed power distribution unit provides power supply to a load that must be configured in the telecommunications equipment, and the variable power supply unit provides power supply to another load, other than a fixed load, that is configured in the telecommunications equipment. This not only avoids a problem of a waste of resources caused when only the fixed power distribution unit is used to provide power supply to all the loads and power distribution of all the loads needs to be connected during initial configuration, but also avoids a problem of an increase in power supply costs caused when only the variable power supply unit is used to provide power supply to all the loads and a power supply unit needs to be configured for each power supply voltage input to provide power supply to all the loads, that is, the telecommunications equipment provided in the present invention improves utilization of a power supply resource, and reduces power supply costs.

Embodiment 2

Figure 3:
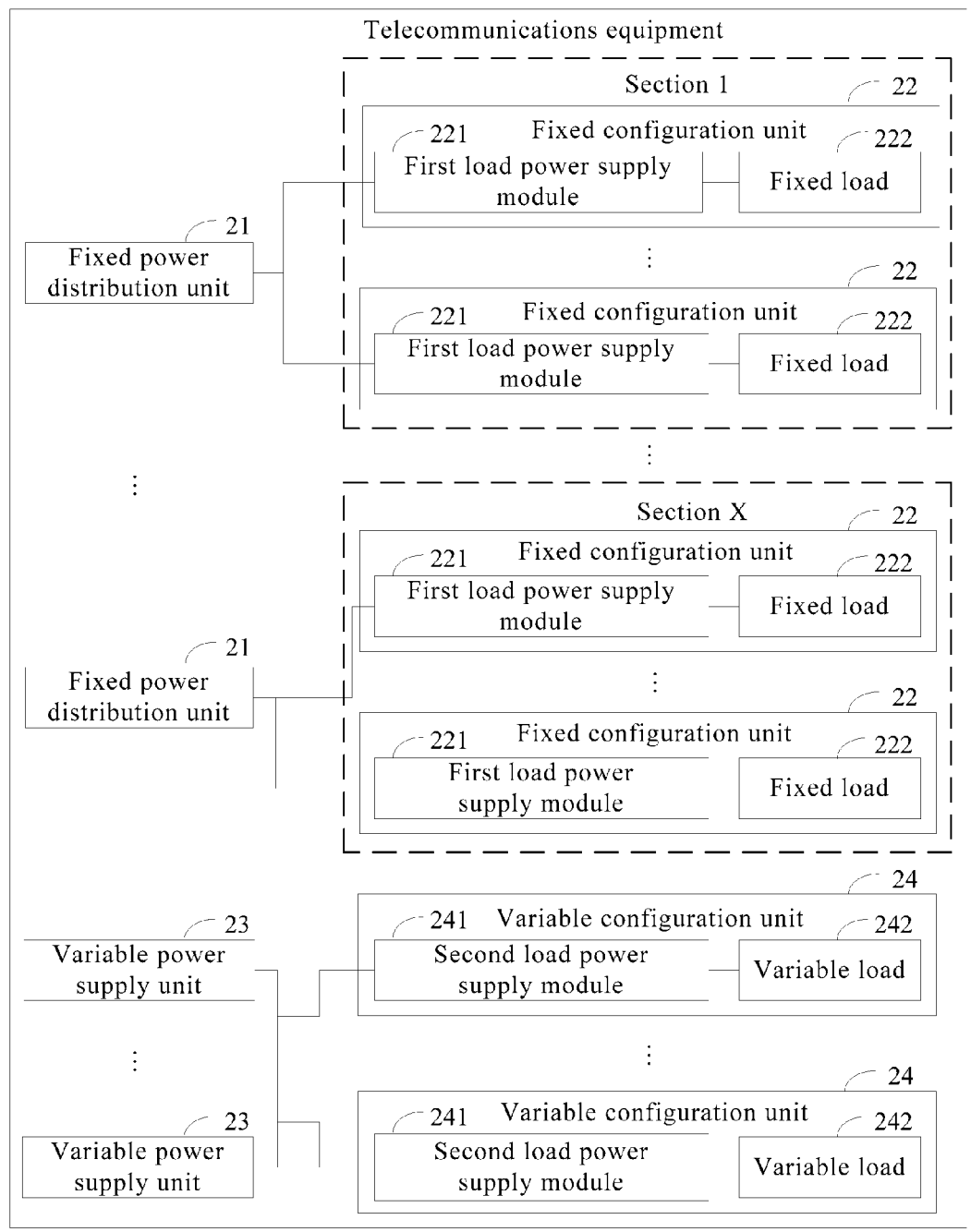
FIG. 3 is a schematic diagram of composition of a telecommunications equipment according to Embodiment 2 of the present invention.

Embodiment 2 of the present invention provides a telecommunications equipment. As shown in FIG. 3, the telecommunications equipment may include: at least one fixed power distribution unit 21, at least one fixed configuration unit 22, at least one variable power supply unit 23, and at least one variable configuration unit 24.

The fixed power distribution unit 21 is corresponding to the fixed configuration unit 22 located in a same section, and an input end of each fixed configuration unit 22 of the at least one fixed configuration unit 22 is connected to an output end of a corresponding fixed power distribution unit 21; and output ends of all the variable power supply units 23 are connected, and an input end of each variable configuration unit 24 of the at least one variable configuration unit 24 is connected to an output end of the variable power supply unit 23.

Each fixed power distribution unit 21 of the at least one fixed power distribution unit 21 is configured to transmit a power supply voltage to a corresponding fixed configuration unit 22 located in a same section.

As shown in FIG. 3, each fixed configuration unit 22 of the at least one fixed configuration unit 22 included in the telecommunications equipment may include: a first load power supply module 221 and a fixed load 222, where the first load power supply module 221 is configured to perform processing on a voltage that is output by the fixed power distribution unit 21, to obtain a voltage required for the fixed load 222 to work normally, and input the voltage required for the fixed load 222 to work normally to the fixed load 222; and the fixed load 222 is a load that must be configured in the telecommunications equipment.

Each variable power supply unit 23 of the at least one variable power supply unit 23 is configured to convert a power supply voltage into a stable direct current voltage.

As shown in FIG. 3, each variable configuration unit 24 of the at least one variable configuration unit 24 included in the telecommunications equipment may include: a second load power supply module 241 and a variable load 242, where the second load power supply module 241 is configured to perform processing on the direct current voltage that is output by the variable power supply unit 23, to obtain a voltage required for the variable load 242 to work normally, and input the voltage required for the variable load 242 to work normally to the variable load 242; and the variable load 242 is a load, other than the fixed load 222, that is configured in the telecommunications equipment.

It should be noted that, for specific descriptions of the fixed power distribution unit 21, the fixed configuration unit 22, the variable power supply unit 23, and the variable configuration unit 24 that are described in this embodiment of the present invention, refer to specific descriptions of corresponding content in Embodiment 1 of the present invention, and details are not described herein again in this embodiment of the present invention.

It should be noted that, in the telecommunications equipment shown in FIG. 3 provided in this embodiment of the present invention, the numbers of the fixed power distribution units 21, the fixed configuration units 22, the variable power supply units 23, and the variable configuration units 24 that are shown are merely intended for ease of understanding for a person skilled in the art, but do not set a specific limitation to the numbers of fixed power distribution units 21, fixed configuration units 22, variable power supply units 23, and variable configuration units 24 included in the telecommunications equipment. The numbers of the fixed power distribution units 21, the fixed configuration units 22, the variable power supply units 23, and the variable configuration units 24 that need to be included in the telecommunications equipment may be configured according to a requirement of an actual application scenario, and this embodiment of the present invention and the accompanying drawings provided in this embodiment of the present invention do not set a specific limitation to the numbers of the fixed power distribution units 21, the fixed configuration units 22, the variable power supply units 23, and the variable configuration units 24 that need to be included in the telecommunications equipment.

Figure 4A:
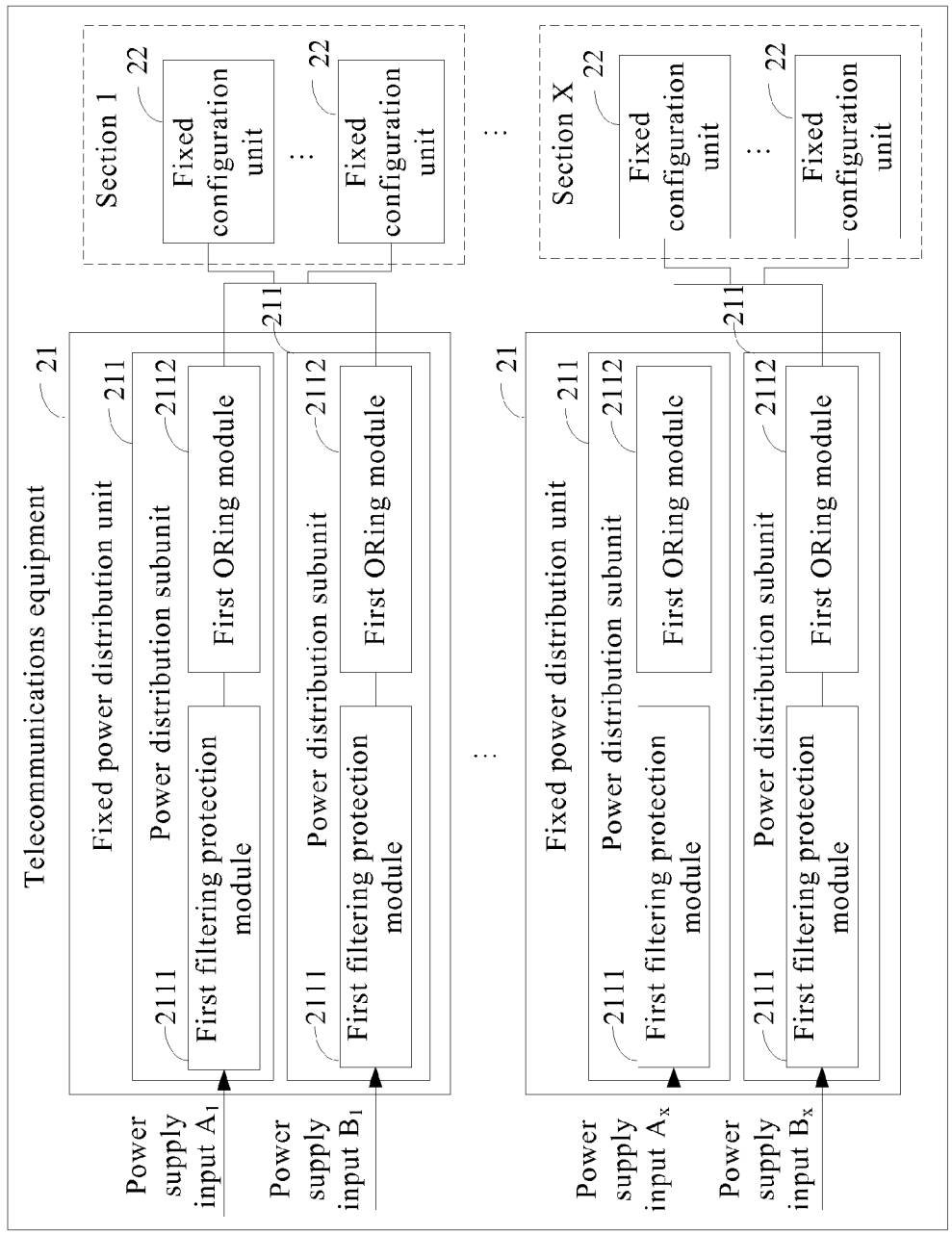
FIG. 4 (including FIG. 4A and FIG. 4B) is a schematic diagram of composition of another telecommunications equipment according to Embodiment 2 of the present invention.
Figure 4B:
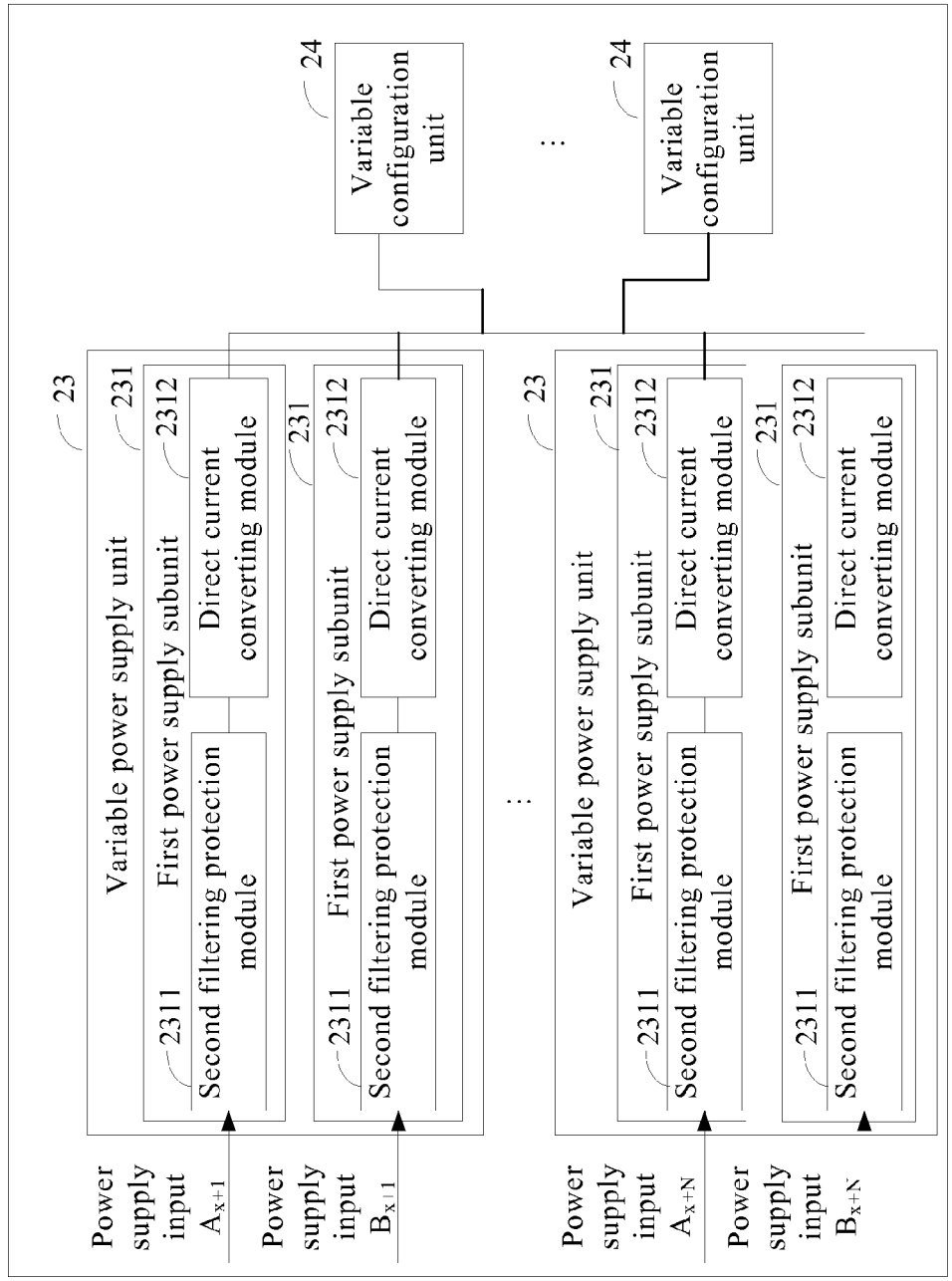

To improve reliability of power supply of the telecommunications equipment and avoid service interruption of the telecommunications equipment caused when there is only one power supply branch circuit and the power supply branch circuit is faulty, generally, two power supply voltage inputs are led in as power supply inputs of one fixed power distribution unit 21 in the telecommunications equipment, to implement mutual backup of the two power supply voltage inputs. Therefore, when two power supply voltage inputs are led in as power supply inputs of one fixed power distribution unit 21 in the telecommunications equipment, further optionally, as shown in FIG. 4, correspondingly, each fixed power distribution unit 21 of the at least one fixed power distribution unit 21 included in the telecommunications equipment may include two power distribution subunits 211, where the two power distribution subunits 211 are in a mutual-backup relationship. Specifically, each of the power distribution subunits 211 performs processing on a corresponding led-in power supply voltage. If a fault occurs on a power supply input led in to one of the power distribution subunits 211, the other power distribution subunit 211 performs processing on the corresponding led-in power supply voltage, and then provides power supply to fixed loads 222 included in all corresponding fixed configuration units 22 located in a same section. Certainly, if no fault occurs on the two power supply voltage inputs led in to the telecommunications equipment, but a fault occurs on one of the power distribution subunits 211, because the two power distribution subunits 211 included in the fixed power distribution unit 21 are also in a mutual-backup relationship, the other power distribution subunit 211 may further continue to provide power supply to the fixed loads 222 included in all the corresponding fixed configuration units 22 located in the same section.

It should be noted that, in this embodiment of the present invention, an equipment room may provide a power supply voltage to the fixed power distribution unit 21 in the telecommunications equipment, and this embodiment of the present invention does not set a limitation herein to a specific device that provides a power supply voltage to the telecommunications equipment.

For example, when an equipment room provides a power supply voltage to the fixed power distribution unit 21 in the telecommunications equipment, as shown in FIG. 4, power supply inputs $A_1$-$A_x$ and $B_1$-$B_x$ are power supply voltages provided by the equipment room to the fixed power distribution unit 21, where $A_1$-$A_x$ are first power supply voltage inputs provided by the equipment room, $B_1$-$B_x$ are second power supply voltage inputs provided by the equipment room, and a first power supply voltage input and a second power supply voltage input are in a mutual-backup relationship. The power supply input $A_1$ and the power supply input $B_1$ may respectively serve as a power supply voltage that is input to two power distribution subunits 211 included in a first fixed power distribution unit 21. After performing processing on the power supply input $A_1$ and the power supply input $B_1$, the two power distribution subunits 211 of the fixed power distribution unit 21 jointly provide power supply to fixed loads 222 included in all corresponding fixed configuration units 22 located in section 1, where a sum of rated power of all the fixed loads 222 located in section 1 is less than or equal to power supply capabilities of the power supply input $A_1$ and the power supply input $B_1$. Similarly, the power supply input $A_2$ and the power supply input $B_2$ may respectively serve as a power supply voltage that is input to two power distribution subunits 211 included in a second fixed power distribution unit 21 (which is are not shown in FIG. 4). After performing processing on the power supply input $A_2$ and the power supply input $B_2$, the two power distribution subunits 211 of the fixed power distribution unit 21 jointly provide power supply to fixed loads 222 included in all corresponding fixed configuration units 22 located in section 2, where a sum of rated power of all the fixed loads 222 located in section 2 is less than or equal to power supply capabilities of the power supply input $A_2$ and the power supply input $B_2$. Likewise, the power supply input $A_x$ and the power supply input $B_x$ may respectively serve as a power supply voltage that is input to two power distribution subunits 211 included in an $X^{th}$ fixed power distribution unit 21. After performing processing on the power supply input $A_x$ and the power supply input $B_x$, the two power distribution subunits 211 of the fixed power distribution unit 21 jointly provide power supply to fixed loads 222 included in all corresponding fixed configuration units 22 located in section X, where a sum of rated power of all the fixed loads 222 located in section X is less than or equal to power supply capabilities of the power supply input $A_x$ and the power supply input $B_x$; and X is a positive integer greater than or equal to 1, and X may be determined in advance according to a sum of rated power of fixed loads 222 included in all fixed configuration units 22.

Each power distribution subunit 211 of the two power distribution subunits 211 included in the fixed power distribution unit 21 may include: a first filtering protection module 2111, configured to perform filtering protection processing on the power supply voltage and transmit a voltage after the processing to a corresponding fixed configuration unit 22 located in a same section.

It should be noted that, in this embodiment of the present invention, when the fixed power distribution unit 21 needs to perform filtering protection processing on a power supply voltage, a filtering protection processing function of the fixed power distribution unit 21 is mainly implemented by the first filtering protection module 2111 included in the power distribution subunit 211 in this embodiment of the present invention. For a specific effect of filtering protection processing in this embodiment of the present invention, refer to specific descriptions of corresponding content in Embodiment 1 of the present invention, and details are not described herein again in this embodiment of the present invention.

Further optionally, each power distribution subunit 211 of the two power distribution subunits 211 included in the fixed power distribution unit 21 may further include: a first ORing module 2112, where an input end of the first ORing module 2112 is connected to an output end of the first filtering protection module 2111; and the first ORing module 2112 is configured to: when a voltage that is output by the first filtering protection module 2111 that belongs to the same power distribution subunit as the first ORing module 2112 meets a preset condition, connect a connection between the power distribution subunit 211 and an input end of the corresponding fixed configuration unit 22 located in the same section, to transmit the voltage that is output by the first filtering protection module 2111 that belongs to the same power distribution subunit as the first ORing module 2112 to the corresponding fixed configuration unit 22 located in the same section.

The meeting a preset condition is that a difference between the output voltage of the first filtering protection module 2111 that belongs to the same power distribution subunit as the first ORing module 2112 and an output voltage of the first filtering protection module 2111 that does not belong to the same power distribution subunit as the first ORing module 2112 is greater than or equal to a preset threshold; and the preset threshold represents a critical value, which connects the connection between the power distribution subunit 211 and the input end of the corresponding fixed configuration unit 22 located in the same section, of the difference between the output voltage of the first filtering protection module 2111 that belongs to the power distribution subunit 211 and the output voltage of the first filtering protection module 2111 that does not belong to the power distribution subunit 211.

For example, the preset threshold is 0.2 V, when the difference between the output voltage of the first filtering protection module 2111 that belongs to the same power distribution subunit as the first ORing module 2112 and the output voltage of the first filtering protection module 2111 that does not belong to the same power distribution subunit as the first ORing module 2112 is greater than or equal to 0.2 V, the connection between the power distribution subunit 211 and the input end of the corresponding fixed configuration unit 22 located in the same section is connected. In this embodiment of the present invention, when the difference between the output voltage of the first filtering protection module 2111 that belongs to the same power distribution subunit as the first ORing module 2112 and the output voltage of the first filtering protection module 2111 that does not belong to the same power distribution subunit as the first ORing module 2112 is less than 0.2 V, connections between the two power distribution subunits 211 and the input ends of the corresponding fixed configuration units 22 located in the same section are connected.

It should be noted that, in this embodiment of the present invention, a specific value may be set for the preset threshold according to a requirement of an actual application scenario; and this embodiment of the present invention does not set a specific limitation herein.

Further optionally, to improve reliability of power supply of the telecommunications equipment and avoid service interruption of the telecommunications equipment caused when there is only one power supply branch circuit and the power supply branch circuit is faulty, two power supply voltage inputs may also be led in as power supply inputs of one variable power supply unit 23 in the telecommunications equipment, to implement mutual backup of the two power supply voltage inputs. When two power supply voltage inputs are led in as power supply inputs of one variable power supply unit 23 in the telecommunications equipment, in a possible implementation manner, as shown in FIG. 4, correspondingly, each variable power supply unit 23 of the at least one variable power supply unit 23 included in the telecommunications equipment may include two first power supply subunits 231, where the two first power supply subunits 231 are in a mutual-backup relationship.

It should be noted that, in this embodiment of the present invention, an equipment room may provide a power supply voltage to the variable power supply unit 23 in the telecommunications equipment, and this embodiment of the present invention does not set a limitation herein to a specific device that provides a power supply voltage to the telecommunications equipment.

Specifically, for example, when an equipment room provides a power supply voltage to the variable power supply unit 23 in the telecommunications equipment, each of the first power supply subunits 231 performs processing on a corresponding power supply voltage led in from the equipment room. If a fault occurs on a power supply input provided by the equipment room to one of the first power supply subunits 231, the other first power supply subunit 231 performs processing on the corresponding power supply voltage led in from the equipment room, and then provides power supply to variable loads 242 included in all variable configuration units 24, to implement backup of a power supply voltage. Certainly, if no fault occurs on the two power supply voltage inputs provided to the telecommunications equipment by the equipment room, but a fault occurs on one of the first power supply subunits 231, because the two first power supply subunits 231 included in the variable power supply unit 23 are also in a mutual-backup relationship, the other first power supply subunit 231 may further continue to provide power supply to the variable loads 242 included in all the variable configuration unit 24, to implement backup of a power supply branch circuit.

For example, as shown in FIG. 4, power supply inputs $A_{x+1}$-$A_{x+N}$ and $B_{x+1}$-$B_{x+N}$ are power supply voltages provided to the variable power supply unit 23 by the equipment room, where $A_{x+1}$-$A_{x+N}$ are first power supply voltage inputs provided by the equipment room, $B_{x+1}$-$B_{x+N}$ are second power supply voltage inputs provided by the equipment room, and a first power supply voltage input and a second power supply voltage input are in a mutual-backup relationship. The power supply input $A_{x+1}$ and the power supply input $B_{x+1}$ may respectively serve as a power supply voltage that is input to two first power supply subunits 231 included in a first variable power supply unit 23, and the power supply input $A_{x+N}$ and the power supply input $B_{x+N}$ may respectively serve as a power supply voltage that is input to two first power supply subunits 231 included in an $N^{th}$ variable power supply unit 23. Output ends of all the first power supply subunits 231 included in the N variable power supply units 23 are connected together in parallel, so that a stable power supply resource pool can be formed after two first power supply subunits 231 included in each variable power supply unit 23 separately performs processing on a corresponding power supply input to obtain a stable direct current voltage, to provide power supply to the variable loads 242 in all the variable configuration units 24, where N is a positive integer greater than or equal to 1, and N may be determined according to a sum of rated power of the variable loads 242 in all the variable configuration units 24 that actually need to be installed in an application scenario.

As shown in FIG. 4, each first power supply subunit 231 of the two first power supply subunits 231 included in the variable power supply unit 23 may include: a second filtering protection module 2311 and a direct current converting module 2312, where an output end of the second filtering protection module 2311 is connected to an input end of the direct current converting module 2312, and an output end of the direct current converting module 2312 is an output end of the variable power supply unit 23.

The second filtering protection module 2311 is configured to perform filtering protection processing on one power supply voltage input.

It should be noted that, in this embodiment of the present invention, when the variable power supply unit 23 needs to perform filtering protection processing on a power supply voltage, a filtering protection processing function of the variable power supply unit 23 is mainly implemented by the second filtering protection module 2311 included in the first power supply subunit 231 in this embodiment of the present invention. For a specific effect of filtering protection processing in this embodiment of the present invention, refer to specific descriptions of corresponding content in Embodiment 1 of the present invention, and details are not described herein again in this embodiment of the present invention.

The direct current converting module 2312 is configured to convert a voltage that is output by the second filtering protection module 2311 into a stable direct current voltage.

Specifically, for example, when an equipment room provides a power supply voltage to the variable power supply unit 23 in the telecommunications equipment, for each first power supply subunit 231 in the variable power supply unit 23, the second filtering protection module 2311 in the first power supply subunit 231 performs filtering protection processing on a corresponding power supply voltage of −48 V or −60 V input from the equipment room, and outputs a voltage obtained after the processing to the direct current converting module 2312, so that the direct current converting module 2312 performs voltage regulation processing on the voltage that is output by the second filtering protection module 2311, to obtain a stable direct current voltage. The output end of the direct current converting module 2312 is the output end of the variable power supply unit 23 (that is, the corresponding first power supply subunit 231); therefore, direct current voltages that are output by all the direct current converting modules 2312 can form a stable power supply resource pool, to provide power supply to the variable loads 242 in all the variable configuration units 24.

It should be noted that, in the telecommunications equipment shown in FIG. 4 provided in this embodiment of the present invention, specific modules included in the fixed configuration unit 22 and in the variable configuration unit 24 are not shown, but each fixed configuration unit 22 in the telecommunications equipment shown in FIG. 4 may also include a first load power supply module 221 and a fixed load 222. Similarly, each variable configuration unit 24 may also include a second load power supply module 241 and a variable load 242. For a specific connection relationship between the first load power supply module 221 and the fixed load 222 that are included in the fixed configuration unit 22, refer to a connection relationship between the first load power supply module 221 and the fixed load 222 that are shown in FIG. 3. Similarly, for a specific connection relationship between the second load power supply module 241 and the variable load 242 that are included in the variable configuration unit 24, refer to a connection relationship between the second load power supply module 241 and the variable load 242 that are shown in FIG. 3.

Because rated power of the variable load 242 and the number of variable loads 242 included in the telecommunications equipment may change according to different deployed services and different application scenarios of the telecommunications equipment, the rated power of the variable load 242 and a sum of rated power of all variable loads 242 included in the telecommunications equipment may also change according to different deployed services and different application scenarios. In this case, the number of variable power supply units 23 that need to be configured in the telecommunications equipment may also change according to different deployed services and different application scenarios. Further optionally, in this embodiment of the present invention, when the variable power supply unit 23 includes two first power supply subunits 231, this embodiment of the present invention herein provides a method for calculating the number of variable power supply units 23 that need to be configured in the telecommunications equipment. For example, the number of variable power supply units 23 that need to be configured in the telecommunications equipment is N, a sum of rated power of all the variable loads 242 is P, and rated output power of the first power supply subunit 231 is Q; when P/Q is an integer, N=P/Q; and when P/Q is not an integer, N=floor(P/Q)+1, where floor( ) is to round down.

Figure 5:
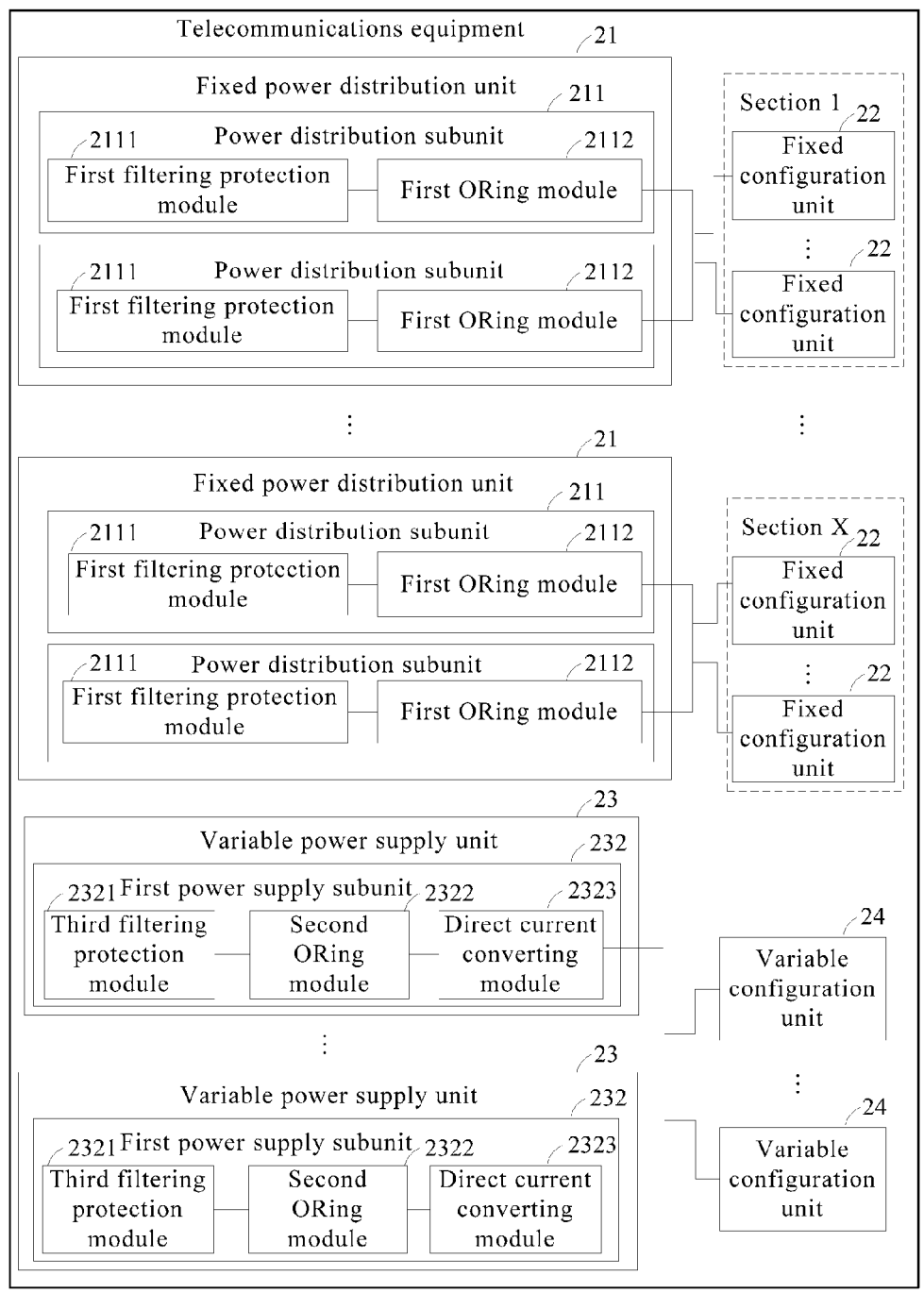
FIG. 5 is a schematic diagram of composition of another telecommunications equipment according to Embodiment 2 of the present invention.

When two power supply inputs are provided for one variable power supply unit 23 to improve reliability of power supply of the telecommunications equipment, in a possible implementation manner, two first power supply subunits 231 needs to be configured for one variable power supply unit 23 in the telecommunications equipment to perform processing on two power supply inputs, respectively. This results in an excessive number of first power supply subunits 231 included in the telecommunications equipment, thereby causing an increase in power supply costs. In this embodiment of the present invention, to reduce power supply costs of the telecommunications equipment, in another possible implementation manner, as shown in FIG. 5, each variable power supply unit 23 of the at least one variable power supply unit 23 included in the telecommunications equipment may include a first power supply subunit 232.

The first power supply subunit 232 may include: a third filtering protection module 2321, a second ORing module 2322, and a direct current converting module 2323, where an output end of the third filtering protection module 2321 is connected to an input end of the second ORing module 2322, an output end of the second ORing module 2322 is connected to an input end of the direct current converting module 2323, and an output end of the direct current converting module 2323 is an output end of the variable power supply unit 23.

The third filtering protection module 2321 is configured to perform filtering protection processing on two power supply voltage inputs.

It should be noted that, in this embodiment of the present invention, when the variable power supply unit 23 needs to perform filtering protection processing on a power supply voltage, a filtering protection processing function of the variable power supply unit 23 is mainly implemented by the third filtering protection module 2321 included in the first power supply subunit 232 in this embodiment of the present invention. For a specific effect of filtering protection processing in this embodiment of the present invention, refer to specific descriptions of corresponding content in Embodiment 1 of the present invention, and details are not described herein again in this embodiment of the present invention.

The second ORing module 2322 is configured to convert two voltage inputs that are output by the third filtering protection module 2321 into one voltage input, and output the one voltage input.

The direct current converting module 2323 is configured to convert a voltage that is output by the second ORing module 2322 into a stable direct current voltage.

Specifically, for example, when an equipment room provides a power supply voltage to the variable power supply unit 23 in the telecommunications equipment, and the equipment room provides two power supply inputs to the variable power supply unit 23, the third filtering protection module 2321 in the first power supply subunit 232 included in the variable power supply unit 23 performs filtering protection processing on the two power supply voltage inputs of −48 V or −60 V input from the equipment room and inputs a voltage obtained after the processing to the second ORing module 2322; and the second ORing module 2322 selects a voltage that is input by the third filtering protection module 2321. If a difference between the two voltage inputs that are input to the second ORing module 2322 is relatively large (for example, the difference between the two voltage inputs that are input to the second ORing module 2322 is greater than 0.2 V), the second ORing module 2322 outputs a voltage input with higher a voltage to the direct current converting module 2323; if the difference between the two voltage inputs that are input to the second ORing module 2322 is relative small (for example, the difference between the two voltage inputs that are input to the second ORing module 2322 is less than 0.2 V), the second ORing module 2322 outputs the two voltage inputs to the direct current converting module 2323, so that the direct current converting module 2323 performs voltage regulation and conversion processing on the voltage that is output by the second ORing module 2322, to obtain a stable direct current voltage. The output end of the direct current converting module 2323 is the output end of the variable power supply unit 23 (that is, the corresponding first power supply subunit 232); therefore, direct current voltages that are output by all the direct current converting modules 2323 can form a stable power supply resource pool, to provide power supply to the variable loads 242 in all the variable configuration units 24. In this embodiment of the present invention, one first power supply subunit 232 is used to perform processing on two power supply voltage inputs, which improves reliability of power supply of the telecommunications equipment and reduces costs. Specifically, when a fault occurs on one power supply voltage input of the first power supply subunit 232, the first power supply subunit 232 performs processing on the other power supply voltage input and provides power supply to the variable loads 242 included in all the variable configuration units 24.

Further optionally, in this embodiment of the present invention, when each variable power supply unit 23 of the variable power supply unit 23 includes a first power supply subunit 232, this embodiment of the present invention herein provides a method for calculating the number of variable power supply units 23 that need to be configured in the telecommunications equipment. For example, the number of variable power supply units 23 that need to be configured in the telecommunications equipment is N+m, a sum of rated power of all the variable loads 242 is P, and rated output power of the first power supply subunit 232 is Q; when P/Q is an integer, N=P/Q; and when P/Q is not an integer, N=floor(P/Q)+1, where floor( ) is to round down, and m is a positive integer greater than or equal to 0 and less than or equal to N.

The m variable power supply units 23 of the N+m variable power supply units 23 are backup power supply units of the N variable power supply units 23; and in this embodiment of the present invention, the m backup power supply units may be any m variable power supply units 23 of the N+m variable power supply units 23. For example, when m=1, the variable power supply units 23 in the telecommunications equipment support N+1 backup, and a power supply resource pool formed by any N variable power supply units 23 of the N+1 variable power supply units 23 can meet a power requirement of all the variable loads 242, and another variable power supply unit 23 other than the N variable power supply units 23 is a backup power supply unit. When a fault occurs on one variable power supply unit 23 of the N variable power supply units 23, to ensure that the variable loads 242 in the telecommunications equipment can still work normally, the another variable power supply unit 23 other than the N variable power supply units 23 may replace the variable power supply unit 23 on which a fault occurs, to continue to provide power supply to the variable loads 242 in the telecommunications equipment. When m=N, the variable power supply units 23 in the telecommunications equipment support N+N backup, and a power supply resource pool formed by any N variable power supply units 23 of the N+N variable power supply units 23 can meet the power requirement of all the variable loads 242, and another N variable power supply units 23 other than the N variable power supply units 23 are backup power supply units. When a fault occurs on one or multiple variable power supply units 23 of the N variable power supply units 23, to ensure that the variable loads 242 in the telecommunications equipment can still work normally, a corresponding number of variable power supply units 23 may replace the variable power supply unit or the variable power supply units on which a fault occurs, to continue to provide power supply to the variable loads 242 in the telecommunications equipment.

It should be noted that, in this embodiment of the present invention, the number m of backup power supply units may be set according to a requirement of an actual application scenario, and this embodiment of the present invention does not set a specific limitation herein.

Figure 6:
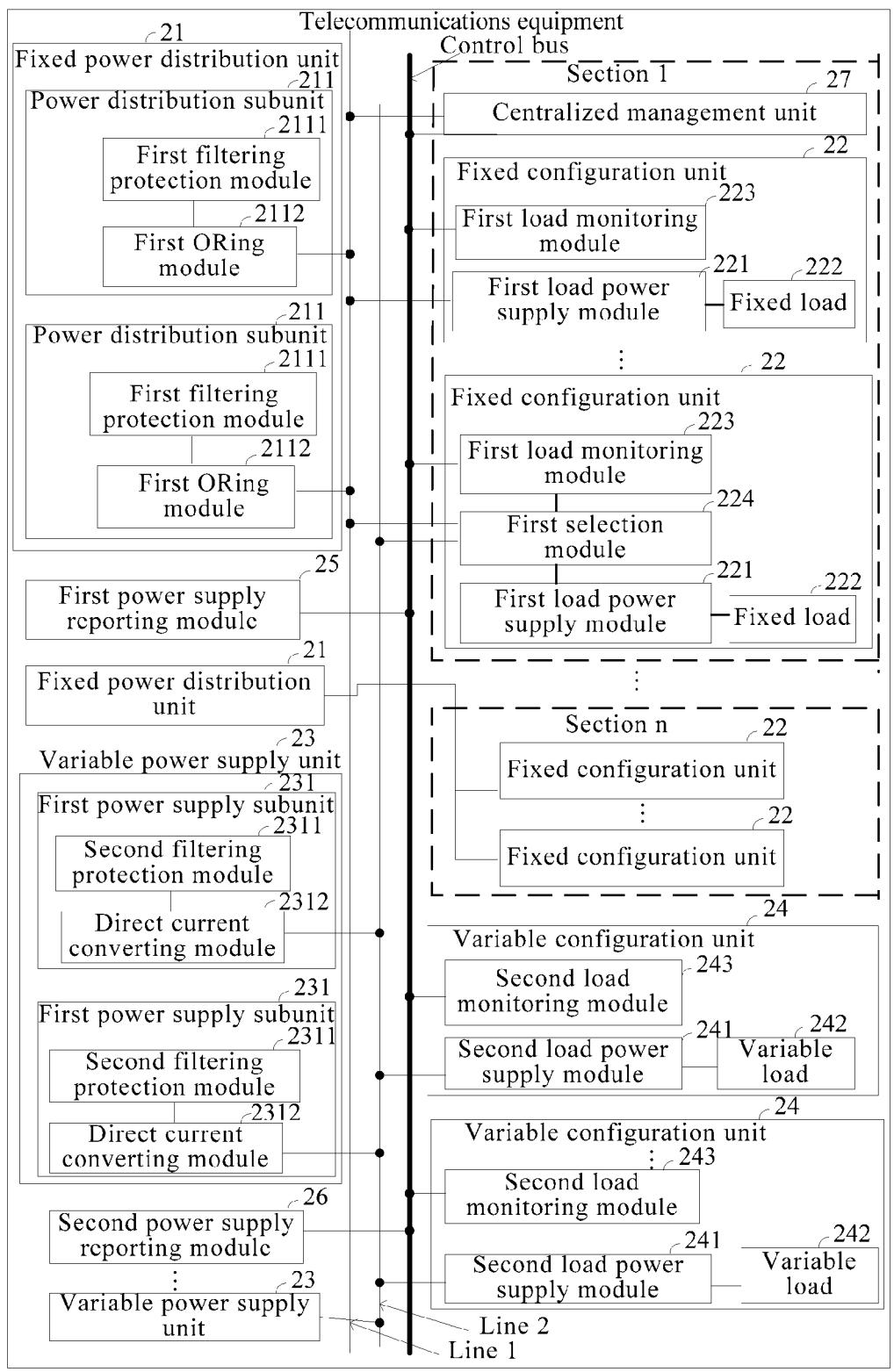
FIG. 6 is a schematic diagram of composition of another telecommunications equipment according to Embodiment 2 of the present invention.

Considering that rated power of a load may change due to upgrade or expansion of the telecommunications equipment in a later stage, and to further improve utilization of a power supply resource and to meet a power requirement of future evolution of the telecommunications equipment, further optionally, in a possible implementation manner, as shown in FIG. 6, the telecommunications equipment may further include: a first power supply reporting module 25, a second power supply reporting module 26, and a centralized management unit 27.

The first power supply reporting module 25 is configured to acquire output power of the fixed power distribution unit 21, and report the output power of the fixed power distribution unit 21 to the centralized management unit 27.

The second power supply reporting module 26 is configured to acquire output power of the variable power supply unit 23, and report the output power of the variable power supply unit 23 to the centralized management unit 27.

The fixed configuration unit 22 may further include: a first load monitoring module 223, configured to monitor rated power of the fixed load 222 and report the rated power of the fixed load 222 to the centralized management unit 27.

The fixed configuration unit 22 may further include: a first selection module 224, where an input end of the first selection module 224 is separately connected to the output end of the fixed power distribution unit 21 and the output end of the variable power supply unit 23, an output end of the first selection module 224 is connected to an input end of the first load power supply module 221, and the first selection module 224 is connected to the first load monitoring module 223. The first selection module 224 is configured to select, from an output voltage of the fixed power distribution unit 21 and an output voltage of the variable power supply unit 23 according to a control operation of the first load monitoring module 223, a voltage input as an input voltage of the fixed configuration unit 22.

The variable configuration unit 24 may further include: a second load monitoring module 243, configured to monitor rated power of the variable load 242 and report the rated power of the variable load 242 to the centralized management unit 27.

It should be noted that, a manner in which the first power supply reporting module 25 acquires the output power of the fixed power distribution unit 21 may be that the first power supply reporting module 25 reads the output power of the fixed power distribution unit 21, which is pre-stored in the first power supply reporting module 25, or may be that the first power supply reporting module 25 monitors the output power of the fixed power distribution unit 21; and the present invention does not set a limitation to the manner in which the first power supply reporting module 25 acquires the output power of the fixed power distribution unit 21. Similarly, a manner in which the second power supply reporting module 26 acquires the output power of the variable power supply unit 23 may be that the second power supply reporting module 26 reads the output power of the variable power supply unit 23, which is pre-stored in the second power supply reporting module 26, or may be that the second power supply reporting module 26 monitors the output power of the variable power supply unit 23; and the present invention does not set a limitation to the manner in which the second power supply reporting module 26 acquires the output power of the variable power supply unit 23.

It should be noted that, in the schematic diagram of composition of the telecommunications equipment shown in FIG. 6 provided in this embodiment of the present invention, line 1 is an output end of a first fixed power distribution unit 21, and line 2 is the output end of all the variable power supply units 23. In addition, in FIG. 6 provided in this embodiment of the present invention, that rated power of a fixed load 222 in one of fixed configuration units 22 in section 1 may change in later-stage upgrade or expansion of the telecommunications equipment is used as an example for illustration. Therefore, two input ends of a first selection module 224 included in the fixed configuration unit 22 are respectively connected to line 1 and line 2, that is, the two input ends of the first selection module 224 included in the fixed configuration unit 22 are respectively connected to an output end of a fixed power distribution unit 21 that provides power supply to section 1 and the output end of all the variable power supply unit 23. In addition, in the telecommunications equipment shown in FIG. 6 provided in the present invention, that the variable power supply unit 23 includes two first power supply subunits 231 is illustrated. For each first power supply subunit 231 of the two first power supply subunits 231, a second power supply reporting module 26 may be configured for the first power supply subunit 231. Certainly, the variable power supply unit 23 may also include only one first power supply subunit 232 (as shown in FIG. 5). In this case, only one second power supply reporting module 26 needs to be configured for the first power supply subunit 232, that is, specific composition of the variable power supply unit 23 in the telecommunications equipment shown in FIG. 6 provided in this embodiment of the present invention is merely an example, but does not set a limitation to the specific composition of the variable power supply unit 23.

Figure 7:
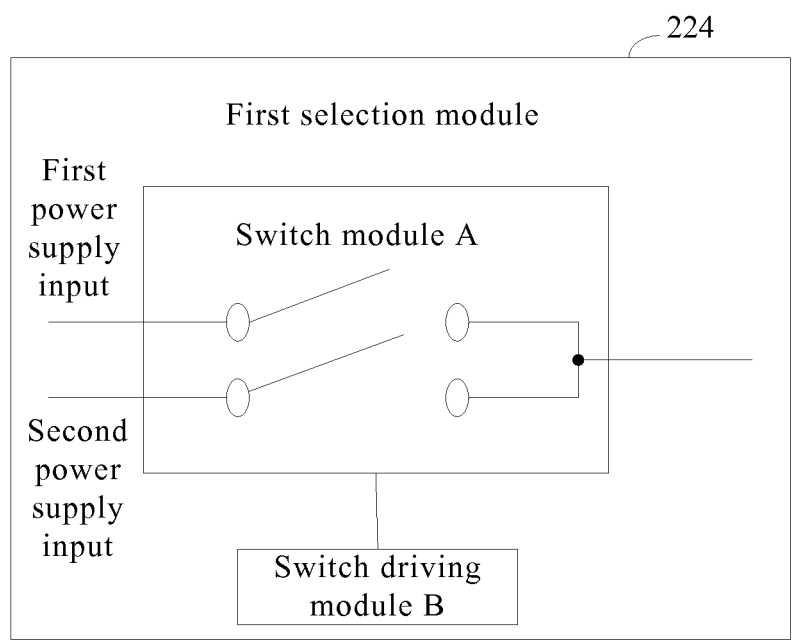
FIG. 7 is a schematic diagram of implementation of a first selection module according to Embodiment 2 of the present invention.

In a possible implementation manner of this embodiment of the present invention, a module that is in the first selection module 224 and executes a function of selecting, from the output voltage of the fixed power distribution unit 21 and the output voltage of the variable power supply unit 23 according to a control operation of the first load monitoring module 223, a voltage input as the input voltage of the fixed configuration unit 22, may be a metal-oxide-semiconductor field-effect transistor (metal-oxide-semiconductor field-effect transistor, MOSFET), or may be a relay. This embodiment of the present invention does not set a limitation herein to a specific implementation manner of the module that is in the first selection module 224 and executes the function of selecting, from the output voltage of the fixed power distribution unit 21 and the output voltage of the variable power supply unit 23 according to a control operation of the first load monitoring module 223, a voltage input as the input voltage of the fixed configuration unit 22. In addition, in this embodiment of the present invention, as shown in FIG. 7, a schematic diagram of implementation of the first selection module 224 is provided. A switch module A shown in FIG. 7 has a selection function of selecting, from the output voltage of the fixed power distribution unit 21 and the output voltage of the variable power supply unit 23, a voltage input as the input voltage of the fixed configuration unit 22; and a switch driving module B shown in FIG. 7 is configured to control, according to a control operation of the first load monitoring module 223, the switch module A to implement the selection function. The output voltage of the fixed power distribution unit 21 and the output voltage of the variable power supply unit 23 are a first power supply input and a second power supply input, respectively; and a power supply output is a voltage selected from the output voltage of the fixed power distribution unit 21 and the output voltage of the variable power supply unit 23 by the switch module. It should be noted that, this embodiment of the present invention herein only provides a possible implement manner of the first selection module 224 for ease of understanding for a person skilled in the art, but does not set a specific limitation to specific implementation of the first selection module 224.

In this embodiment of the present invention, the telecommunications equipment may further include: the centralized management unit 27, configured to determine a first trigger instruction according to the output power of the fixed power distribution unit 21, the output power of the variable power supply unit 23, the rated power of the fixed load 222, and the rated power of the variable load 242, and transmit the first trigger instruction to the first load monitoring module 223, where the first trigger instruction is used to instruct the first load monitoring module 223 to control the first selection module 224 to select, from the output voltage of the fixed power distribution unit 21 and the output voltage of the variable power supply unit 23, the output voltage of the fixed power distribution unit 21 or the output voltage of the variable power supply unit 23 as the input voltage of the fixed configuration unit 22.

A principle for determining the first trigger instruction may be that:

when there is a surplus of the output power of the fixed power distribution unit 21, the first trigger instruction is used to instruct the first load monitoring module 223 to control the first selection module 224 to select the output voltage of the fixed power distribution unit 21 as the input voltage of the fixed configuration unit 22; or when there is a surplus of the output power of the variable power supply unit 23, the first trigger instruction is used to instruct the first load monitoring module 223 to control the first selection module 224 to select the output voltage of the variable power supply unit 23 as the input voltage of the fixed configuration unit 22; or when there is a surplus of both the output power of the fixed power distribution unit 21 and the output power of the variable power supply unit 23, the first trigger instruction is used to instruct the first load monitoring module 223 to control the first selection module 224 to preferably select the output voltage of the fixed power distribution unit 21 as the input voltage of the fixed configuration unit 22.

It should be noted that, in this embodiment of the present invention, it may be that the centralized management unit 27 must be configured in the telecommunications equipment; therefore, the centralized management unit 27 may be considered as a special fixed configuration unit, and the fixed power distribution unit 21 provides power supply to the centralized management unit 27.

It should be noted that, for each fixed power distribution unit 21 of the at least one fixed power distribution unit 21 included in the telecommunications equipment, when the fixed power distribution unit 21 includes two power distribution subunits 211, in a possible implementation manner of this embodiment of the present invention, for each power distribution subunit 211 of the two power distribution subunits 211, a first power supply reporting module 25 may be configured for the power distribution subunit 211 (in FIG. 6, only that one first power supply reporting module 25 is configured for one fixed power distribution unit 21 is illustrated as an example, which, however, does not set a limitation to the number of first power supply reporting modules 25 configured for the fixed power distribution unit 21), and the first power supply reporting module 25 is configured to acquire output power of the corresponding power distribution subunit 211 in the fixed power distribution unit 21 and report the acquired output power of the power distribution subunit 211 to the centralized management unit 27. After receiving output power of the two power distribution subunits 211 included in the fixed power distribution unit 21, the centralized management unit 27 can learn a power supply capability of the fixed power distribution unit 21 according to the output power of the two power distribution subunits 211 (for example, if the output power of the two power distribution subunits 211 is the same, the centralized management unit 27 selects the output power of any power distribution subunit 211 of the two power distribution subunits 211 as the power supply capability of the fixed power distribution unit 21; and if the output power of the two power distribution subunits 211 is different, the centralized management unit 27 selects the output power of the power distribution subunit 211 with lower output power as the power supply capability of the fixed power distribution unit 21). For each variable power supply unit 23 of the at least one variable power supply unit 23 included in the telecommunications equipment, when the variable power supply unit 23 includes two first power supply subunits 231, in a possible implementation manner of this embodiment of the present invention, for each first power supply subunit 231 of the two first power supply subunits 231, a second power supply reporting module 26 may be configured for the first power supply subunit 231 (in FIG. 6, only that one second power supply reporting module 26 is configured for one variable power supply unit 23 is illustrated as an example, which, however, does not set a limitation to the number of second power supply reporting modules 26 configured for the variable power supply unit 23); and the second power supply reporting module 26 is configured to acquire output power of the corresponding first power supply subunit 231 in the variable power supply unit 23 and report the acquired output power of the first power supply subunit 231 to the centralized management unit 27. After receiving output power of the two first power supply subunits 231 included in the variable power supply unit 23, the centralized management unit 27 can learn a power supply capability of the variable power supply unit 23 according to the output power of the two first power supply subunits 231, thereby obtaining a power supply capability of a power supply resource pool formed by all the variable power supply units 23 included in the telecommunications equipment.

Specifically, for each fixed power distribution unit 21 of the at least one fixed power distribution unit 21 included in the telecommunications equipment, the first power supply reporting module 25 configured for the fixed power distribution unit 21 may report the acquired output power of the fixed power distribution unit 21 to the centralized management unit 27 by using a control bus, so that the centralized management unit 27 learns the power supply capability of the fixed power distribution unit 21. For each variable power supply unit 23 of the at least one variable power supply unit 23 included in the telecommunications equipment, the second power supply reporting module 26 configured for the variable power supply unit 23 may report the acquired output power of the variable power supply unit 23 to the centralized management unit 27 by using the control bus, so that the centralized management unit 27 learns the power supply capability of the variable power supply unit 23. Similarly, for each fixed configuration unit 22 of the at least one fixed configuration unit 22 included in the telecommunications equipment, the first load monitoring module 223 in the fixed configuration unit 22 may also report the rated power of the fixed load 222 included in the fixed configuration unit 22, which is obtained through monitoring, to the centralized management unit 27 by using the control bus, so that the centralized management unit 27 learns a power requirement of the fixed configuration unit 22. For each variable configuration unit 24 of the at least one variable configuration unit 24 included in the telecommunications equipment, the second load monitoring module 243 in the variable configuration unit 24 may also report the rated power of the variable configuration unit 242 included in the variable configuration unit 24, which is obtained through monitoring, to the centralized management unit 27 by using the control bus, so that the centralized management unit 27 learns a power requirement of the variable configuration unit 24.

Specifically, the first trigger instruction may be determined according to the following condition:

when a sum of rated power of all the fixed loads 222 corresponding to the fixed power distribution unit 21 located in the same section is less than or equal to the output power of the fixed power distribution unit 21, the first trigger instruction is used to instruct the first load monitoring module 223 to control the first selection module 224 to select, from the output voltage of the fixed power distribution unit 21 and the output voltage of the variable power supply unit 23, the output voltage of the fixed power distribution unit 21 as the input voltage of the fixed configuration unit 22; or when a sum of rated power of all the fixed loads 222 corresponding to the fixed power distribution unit 21 located in the same section is greater than the output power of the fixed power distribution unit 21, and a sum of output power of all the variable power supply units 23 is greater than or equal to a sum of rated power of all the variable loads 242 and the rated power of all the fixed loads 222; or when a sum of output power of all the variable power supply units 23 is greater than or equal to a sum of rated power of all the variable loads 242 and the rated power of all the fixed loads 222, the first trigger instruction is used to instruct the first load monitoring module 223 to control the first selection module 224 to select, from the output voltage of the fixed power distribution unit 21 and the output voltage of the variable power supply unit 23, the output voltage of the variable power supply unit 23 as the input voltage of the fixed configuration unit 22; or when a sum of the rated power of all the fixed loads 222 corresponding to the fixed power distribution unit 21 located in the same section is less than or equal to the output power of the fixed power distribution unit 21, and a sum of output power of all the variable power supply units 23 is greater than or equal to a sum of rated power of all the variable loads 242 and the rated power of all the fixed loads 222, the first trigger instruction is used to instruct the first load monitoring module 223 to control the first selection module 224 to preferably select, from the output voltage of the fixed power distribution unit 21 and the output voltage of the variable power supply unit 23, the output voltage of the fixed power distribution unit 21 as the input voltage of the fixed configuration unit 22.

For example, when a fixed load 222 in a fixed configuration unit 22 needs to be replaced due to upgrade or expansion of the telecommunications equipment, which causes a change to rated power of the fixed load 222, and further causes a change to a sum of rated power of all fixed loads 222 included in a section in which the fixed configuration unit 22 is located, the centralized management unit 27 may first determine whether a power supply capability of the fixed power distribution unit 21 is sufficient according to output power, which is reported by the first power supply reporting module 25, of a fixed power distribution unit 21 that provides power supply to the fixed load 222 and according to a sum of rated power of fixed loads 222 (which include the fixed load 222, and rated power of the fixed load 222 is the changed rated power) in all fixed configuration units 22 located in the same section as the fixed configuration unit 22 corresponding to the fixed load 222, that is, determine whether the sum of the rated power of the fixed loads 222 in all the fixed configuration units 22 located in the same section as the fixed configuration unit 22 corresponding to the fixed load 222 is less than or equal to the output power of the fixed power distribution unit 21 that provides power supply to the fixed load 222, which is reported by the first power supply reporting module 25. If the power supply capability of the fixed power distribution unit 21 is sufficient, the centralized management unit 27 determines a first trigger instruction (where the first trigger instruction is used to instruct a first load monitoring module 223 to control a first selection module 224 to select, from an output voltage of a fixed power distribution unit 21 and an output voltage of a variable power supply unit 23, the output voltage of the fixed power distribution unit 21 as an input voltage of the fixed configuration unit 22), and transmits the first trigger instruction to a first load monitoring module 223 in the fixed configuration unit 22 in which the fixed load 222 is located, so that the first load monitoring module 223 controls, according to the first trigger instruction, the first selection module 224 to select the output voltage of the fixed power distribution unit 21 as an input voltage of the fixed configuration unit 22, that is, select the fixed power distribution unit 21 to provide power supply to the fixed load 222.

If the power supply capability of the fixed power distribution unit 21 is insufficient, and the power supply capability of the power supply resource pool formed by all the variable power supply units 23 configured in the telecommunications equipment is sufficient, that is, the sum of the rated power of the fixed loads 222 in all the fixed configuration units 22 located in the same section as the fixed configuration unit 22 corresponding to the fixed load 222 is greater than the output power of the fixed power distribution unit 21 that provides power supply to the fixed load 222, which is reported by the first power supply reporting module 25, and the sum of the output power of all the variable power supply units 23 is greater than or equal to a sum of the rated power of all the variable loads 242 and rated power of all the fixed loads 222 (where the rated power of the fixed load 222 is the changed rated power); or, if the sum of the output power of all the variable power supply units 23 is greater than or equal to a sum of the rated power of all the variable loads 242 and rated power of all the fixed loads 222 (where the rated power of the fixed load 222 is the changed rated power), the centralized management unit 27 determines a first trigger instruction (where the first trigger instruction is used to instruct the first load monitoring module 223 to control the first selection module 224 to select, from the output voltage of the fixed power distribution unit 21 and the output voltage of the variable power supply unit 23, the output voltage of the variable power supply unit 23 as the input voltage of the fixed configuration unit 22), and transmits the first trigger instruction to the first load monitoring module 223 in the fixed configuration unit 22 in which the fixed load 222 is located, so that the first load monitoring module 223 controls, according to the first trigger instruction, the first selection module 224 to select the output voltage of the variable power supply unit 23 as the input voltage of the fixed configuration unit 22, that is, select the variable power supply unit 23 to provide power supply to the fixed load 222, so that a sum of rated power of fixed loads 222 (other than the fixed load 222) in all the fixed configuration units 22 located in the same section as the fixed configuration unit 22 corresponding to the fixed load 222 is less than the output power of the fixed power distribution unit 21 that provides power supply to the fixed load 222, which is reported by the first power supply reporting module 25.

If the power supply capability of the fixed power distribution unit 21 is sufficient, that is, the sum of the rated power of the fixed loads 222 in all the fixed configuration units 22 located in the same section as the fixed configuration unit 22 corresponding to the fixed load 222 is less than or equal to the output power of the fixed power distribution unit 21 that provides power supply to the fixed load 222 (where the rated power of the fixed load 222 is the changed rated power), which is reported by the first power supply reporting module 25, and the power supply capability of the power supply resource pool formed by all the variable power supply units 23 configured in the telecommunications equipment is sufficient, that is, the sum of the output power of all the variable power supply units 23 is greater than or equal to the sum of the rated power of all the variable loads 242 and the rated power of all the fixed loads 222 (where the rated power of the fixed load 222 is the changed rated power), the centralized management unit 27 determines a first trigger instruction (where the first trigger instruction is used to instruct the first load monitoring module 223 to control the first selection module 224 to preferably select, from the output voltage of the fixed power distribution unit 21 and the output voltage of the variable power supply unit 23, the output voltage of the fixed power distribution unit 21 as the input voltage of the fixed configuration unit 22), and transmits the first trigger instruction to the first load monitoring module 223 in the fixed configuration unit 22 in which the fixed load 222 is located, so that the first load monitoring module 223 controls, according to the first trigger instruction, the first selection module 224 to preferably select the output voltage of the fixed power distribution unit 21 as the input voltage of the fixed configuration unit 22, that is, select the fixed power distribution unit 21 to provide power supply to the fixed load 222.

If the power supply capability of the fixed power distribution unit 21 is insufficient, and the power supply capability of the power supply resource pool formed by all the variable power supply units 23 configured in the telecommunications equipment is insufficient, that is, the sum of the rated power of the fixed loads 222 in all the fixed configuration units 22 located in the same section as the fixed configuration unit 22 corresponding to the fixed load 222 is greater than the output power of the fixed power distribution unit 21 that provides power supply to the fixed load 222, and the sum of the output power of all the variable power supply units 23 is less than the sum of the rated power of all the variable loads 242 and the rated power of the fixed load 222 whose rated power is changed, power supply to the fixed load 222 whose rated power is changed may be implemented by adding a variable power supply unit 23. Specifically, in a possible implementation manner, the number of variable power supply units 23 that need to be added may be obtained through calculation according to a sum of rated power of some loads (where the loads include the fixed load 222 whose rated power is changed and all the variable loads 242 included in telecommunications equipment before the rated power of the fixed load 222 is changed) currently included in the telecommunications equipment. For a specific calculation method, refer to the method for calculating the number of variable power supply units 23 in this embodiment of the present invention, and details are not described herein again in this embodiment of the present invention. In another possible implementation manner, the number of variable power supply units 23 that need to be added may be obtained through calculation according to the rated power of the fixed load 222 whose rated power is changed. For a specific calculation method, refer to the method for calculating the number of variable power supply units 23 in this embodiment of the present invention, and details are not described herein again in this embodiment of the present invention.

Figure 8:
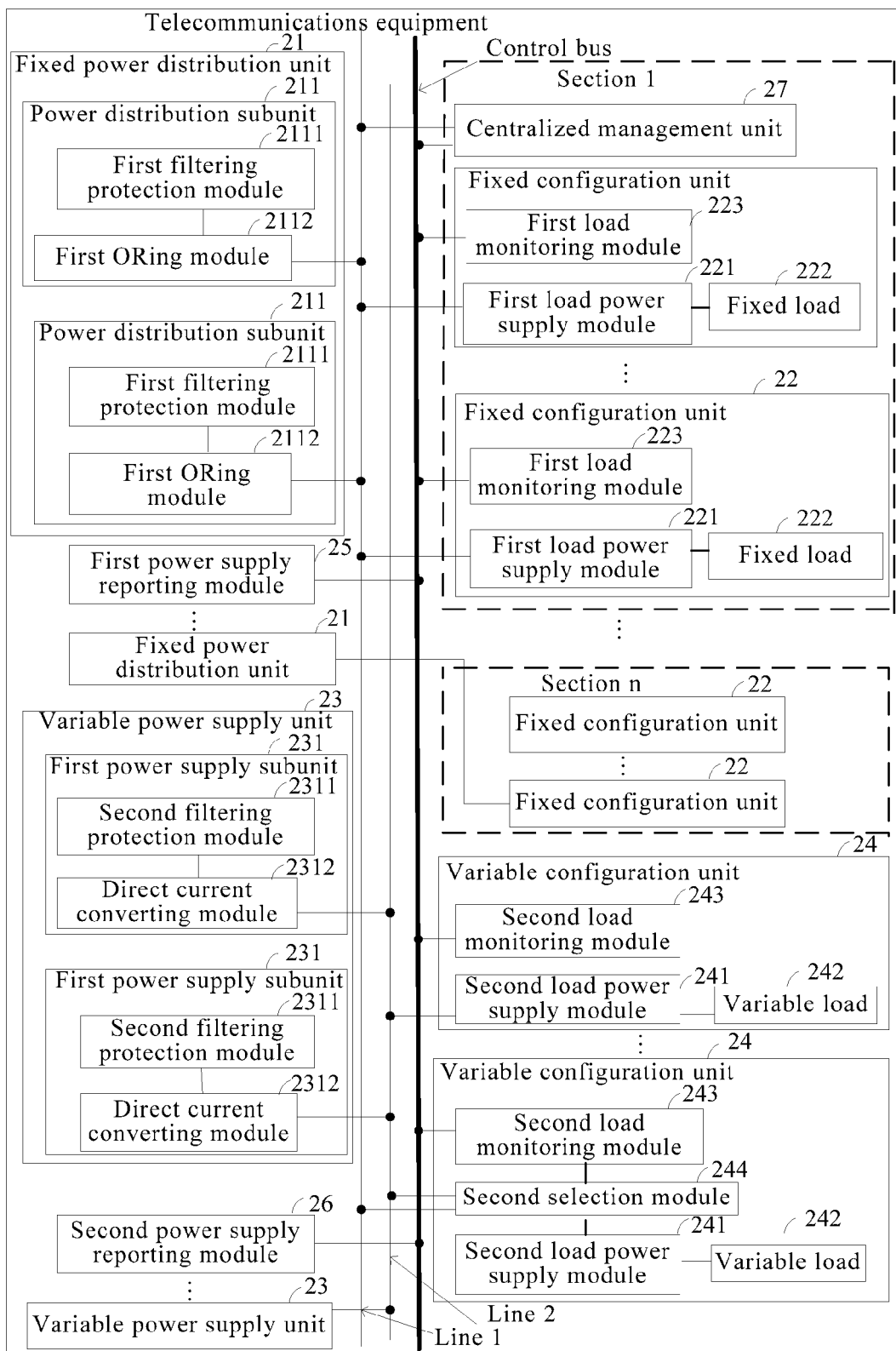
FIG. 8 is a schematic diagram of composition of another telecommunications equipment according to Embodiment 2 of the present invention.

Further optionally, in a possible implementation manner, as shown in FIG. 8, the telecommunications equipment may further include: a first power supply reporting module 25, a second power supply reporting module 26, and a centralized management unit 27.

The first power supply reporting module 25 is configured to acquire output power of the fixed power distribution unit 21, and report the output power of the fixed power distribution unit 21 to the centralized management unit 27.

The second power supply reporting module 26 is configured to acquire output power of the variable power supply unit 23, and report the output power of the variable power supply unit 23 to the centralized management unit 27.

The fixed configuration unit 22 may further include: a first load monitoring module 223, configured to monitor rated power of the fixed load 222 and report the rated power of the fixed load 222 to the centralized management unit 27.

The variable configuration unit 24 may further include: a second load monitoring module 243, configured to monitor rated power of the variable load 242 and report the rated power of the variable load 242 to the centralized management unit 27.

The variable configuration unit 24 may further include: a second selection module 244, where an input end of the second selection module 244 is separately connected to the output end of the fixed power distribution unit 21 and the output end of the variable power supply unit 23, an output end of the second selection module 244 is connected to an input end of the second load power supply module 241, and the second selection module 244 is connected to the second load monitoring module 243. The second selection module 244 is configured to select, from an output voltage of the fixed power distribution unit 21 and an output voltage of the variable power supply unit 23 according to a control operation of the second load monitoring module 243, a voltage input as an input voltage of the variable configuration unit 24.

It should be noted that, for a manner in which the first power supply reporting module 25 acquires the output power of the fixed power distribution unit 21 and a manner in which the second power supply reporting module 26 acquires the output power of the variable power supply unit 23, refer to descriptions of related content in this embodiment of the present invention, and details are not described herein again.

It should be noted that, in the schematic diagram of composition of the telecommunications equipment shown in FIG. 8 provided in this embodiment of the present invention, line 1 is an output end of a first fixed power distribution unit 21, and line 2 is the output end of all the variable power supply units 23. In addition, in FIG. 8 provided in this embodiment of the present invention, that a fixed power distribution unit 21 that provides power supply to section 1, or the power supply resource pool formed by all the variable power supply units 23 may be selected and provide power supply to a second selection module 244 in a variable configuration unit 24 whose rated power may change in later-stage upgrade or expansion of the telecommunications equipment (or in a variable configuration unit 24 that needs to be added in later-stage upgrade or expansion of the telecommunications equipment) is illustrated as an example; therefore, two input ends of the second selection module 244 included in the variable configuration unit 24 are respectively connected to line 1 and line 2, that is, the two input ends of the second selection module 244 included in the variable configuration unit 24 are respectively connected to an output end of the fixed power distribution unit 21 that provides power supply to section 1 and the output end of all the variable power supply units 23. The schematic diagram of the composition of the telecommunications equipment provided herein in this embodiment of the present invention are merely intended for ease of understanding for a person skilled in the art, but does not set a limitation thereto. In addition, in an example of the telecommunications equipment shown in FIG. 8 provided in the present invention, the variable power supply unit 23 includes two first power supply subunits 231. In this case, for each first power supply subunit 231 of the two first power supply subunits 231, a second power supply reporting module 26 may be configured for the first power supply subunit 231. Certainly, the variable power supply unit 23 may also include only one first power supply subunit 232 (as shown in FIG. 5). In this case, only one second power supply reporting module 26 needs to be configured for the first power supply subunit 232, that is, specific composition of the variable power supply unit 23 in the telecommunications equipment shown in FIG. 8 provided in this embodiment of the present invention is merely an example, but does not set a limitation to the specific composition of the variable power supply unit 23.

It should be noted that, as shown in FIG. 8, for each fixed power distribution unit 21 of the at least one fixed power distribution unit 21 included in the telecommunications equipment, when the fixed power distribution unit 21 includes two power distribution subunits 211, in a possible implementation manner of this embodiment of the present invention, for each power distribution subunit 211 of the two power distribution subunits 211, a first power supply reporting module 25 may be configured for the power distribution subunit 211 (FIG. 8 is only a schematic diagram of an example in which one first power supply reporting module 25 is configured for one fixed power distribution unit 21, which, however, does not set a limitation to the number of first power supply reporting modules 25 configured for the fixed power distribution unit 21). Similarly, for each variable power supply unit 23 of the at least one variable power supply unit 23 included in the telecommunications equipment, when the variable power supply unit 23 includes two first power supply subunits 231, in a possible implementation manner of this embodiment of the present invention, for each first power supply subunit 231 of the two first power supply subunits 231, a second power supply reporting module 26 may be configured for the first power supply subunit 231 (FIG. 8 is only a schematic diagram of an example in which one second power supply reporting module 26 is configured for one variable power supply unit 23, which, however, does not set a limitation to the number of second power supply reporting modules 26 configured for the variable power supply unit 23).

In another possible implementation manner of this embodiment of the present invention, a module that is in the second selection module 244 and executes a function of selecting, from the output voltage of the fixed power distribution unit 21 and the output voltage of the variable power supply unit 23 according to a control operation of the second load monitoring module 243, a voltage input as the input voltage of the variable configuration unit 24, may be a MOSFET, or may be a relay; and this embodiment of the present invention does not set a limitation herein to a specific implementation manner of the module that is in the second selection module 244 and executes the function of selecting, from the output voltage of the fixed power distribution unit 21 and the output voltage of the variable power supply unit 23 according to a control operation of the second load monitoring module 243, a voltage input as the input voltage of the variable configuration unit 24, either.

It should be noted that, for a possible implementation manner of the second selection module 244, refer to the implementation manner of the first selection module 224, and details are not described herein again in this embodiment of the present invention.

The telecommunications equipment may further include: the centralized management unit 27, configured to determine a second trigger instruction according to the output power of the fixed power distribution unit 21, the output power of the variable power supply unit 23, the rated power of the fixed load 222, and the rated power of the variable load 242, and transmit the second trigger instruction to the second load monitoring module 243, where the second trigger instruction is used to instruct the second load monitoring module 243 to control the second selection module 244 to select, from the output voltage of the fixed power distribution unit 21 and the output voltage of the variable power supply unit 23, the output voltage of the fixed power distribution unit 21 or the output voltage of the variable power supply unit 23 as the input voltage of the variable configuration unit 24.

A principle for determining the second trigger instruction may be that:

when there is a surplus of the output power of the fixed power distribution unit 21, the second trigger instruction is used to instruct the second load monitoring module 243 to control the second selection module 244 to select the output voltage of the fixed power distribution unit 21 as the input voltage of the variable configuration unit 24; or when there is a surplus of the output power of the variable power supply unit 23, the second trigger instruction is used to instruct the second load monitoring module 243 to control the second selection module 244 to select the output voltage of the variable power supply unit 23 as the input voltage of the variable configuration unit 24; or when there is a surplus of both the output power of the fixed power distribution unit 21 and the output power of the variable power supply unit 23, the second trigger instruction is used to instruct the second load monitoring module 243 to control the second selection module 244 to preferably select the output voltage of the fixed power distribution unit 21 as the input voltage of the variable configuration unit 24.

It should be noted that, for a manner in which the centralized management unit 27 learns, according to output power reported by first power supply reporting modules 25 respectively configured for two power distribution subunits 211 included in the fixed power distribution unit 21, a power supply capability of the fixed power distribution unit 21 when the fixed power distribution unit 21 includes the two power distribution subunits 211, and for a manner in which the centralized management unit 27 learns, according to output power reported by second power supply reporting modules 26 respectively configured for the two first power supply subunits 231 included in the variable power supply unit 23, a power supply capability of the variable power supply unit 23 when the variable power supply unit 23 includes the two first power supply subunits 231, to obtain the power supply capability of the power supply resource pool formed by all the variable power supply units 23 included in the telecommunications equipment, refer to specific descriptions of corresponding content in this embodiment of the present invention, and details are not described herein again in this embodiment of the present invention.

Specifically, the second trigger instruction may be determined according to the following condition:

when a difference between the output power of the fixed power distribution unit 21 and a sum of rated power of all the fixed loads 222 corresponding to the fixed power distribution unit 21 located in the same section is greater than zero, and the difference is greater than or equal to the rated power of the variable load 242, the second trigger instruction is used to instruct the second load monitoring module 243 to control the second selection module 244 to select, from the output voltage of the fixed power distribution unit 21 and the output voltage of the variable power supply unit 23, the output voltage of the fixed power distribution unit 21 as the input voltage of the variable configuration unit 24; or when a difference between the output power of the fixed power distribution unit 21 and a sum of rated power of all the fixed loads 222 corresponding to the fixed power distribution unit 21 located in the same section is greater than zero, the difference is less than the rated power of the variable load 242, and a sum of output power of all the variable power supply units 23 is greater than or equal to a sum of rated power of all the variable loads 242; or when differences between output power of each fixed power distribution unit 21 of the at least one fixed power distribution unit 21 included in the telecommunications equipment and the sum of the rated power of all the fixed loads 222 corresponding to the fixed power distribution unit 21 located in the same section are all less than zero, and a sum of output power of all the variable power supply units 23 is greater than or equal to a sum of rated power of all the variable loads 242; or when a sum of output power of all the variable power supply units 23 is greater than or equal to a sum of rated power of all the variable loads 242, the second trigger instruction is used to instruct the second load monitoring module 243 to control the second selection module 244 to select, from the output voltage of the fixed power distribution unit 21 and the output voltage of the variable power supply unit 23, the output voltage of the variable power distribution unit 23 as the input voltage of the variable configuration unit 24; or when a difference between the output power of the fixed power distribution unit 21 and a sum of rated power of all the fixed loads 222 corresponding to the fixed power distribution unit 21 located in the same section is greater than zero, the difference is greater than or equal to the rated power of the variable load 242, and a sum of output power of all the variable power supply units 23 is greater than or equal to a sum of rated power of all the variable loads 242, the second trigger instruction is used to instruct the second load monitoring module 243 to control the second selection module 244 to preferably select, from the output voltage of the fixed power distribution unit 21 and the output voltage of the variable power supply unit 23, the output voltage of the fixed power distribution unit 21 as the input voltage of the variable configuration unit 24.

For example, when a variable load 242 in a variable configuration unit 24 needs to be replaced or a variable configuration unit 24 (including a variable load 242) needs to be added due to upgrade or expansion of the telecommunications equipment, which causes a change to a sum of rated power of all variable loads 242 included in the telecommunications equipment, for each fixed power distribution unit 21 of all fixed power distribution units 21, the centralized management unit 27 may first determine whether there is a surplus of power supply capability of the fixed power distribution unit 21 according to the output power of the fixed power distribution unit 21, which is reported by the first power supply reporting module 25 configured for the fixed power distribution unit 21, and according to a sum of rated power of fixed loads 222 in all fixed configuration units 22 located in the same section as the fixed configuration unit 22, and then determine whether a surplus of the power supply capability of the fixed power distribution unit 21 can meet a power requirement of the variable configuration unit 24, that is, determine whether a difference between the output power of the fixed power distribution unit 21, which is reported by the first power supply reporting module 25 configured for the fixed power distribution unit 21, and the sum of the rated power of the fixed loads 222 in all the fixed configuration units 22 located in the same section as the fixed configuration unit 22 is greater than zero, and whether the difference is greater than or equal to rated power of the variable load 242 whose rated power is changed. If there is a surplus of the power supply capability of the fixed power distribution unit 21, and the surplus can meet the power requirement of the variable configuration unit 24, the centralized management unit 27 determines a second trigger instruction (where the second trigger instruction is used to instruct a second load monitoring module 243 to control a second selection module 244 to select, from the output voltage of the fixed power distribution unit 21 and the output voltage of the variable power supply unit 23, the output voltage of the fixed power distribution unit 21 as an input voltage of the variable configuration unit 24), and transmits the second trigger instruction to a second load monitoring module 243 in the variable configuration unit 24, so that the second load monitoring module 243 controls, according to the second trigger instruction, the second selection module 244 to select the output voltage of the fixed power distribution unit 21 as the input voltage of the variable configuration unit 24, that is, select the fixed power distribution unit 21 to provide power supply to the variable load 242.

If there is a surplus of power supply capabilities of some fixed power distribution units 21 included in the telecommunications equipment, but a surplus of a power supply capability of each fixed power distribution unit 21 in those fixed power distribution units 21 with surplus power supply capabilities cannot meet the power requirement of the variable configuration unit 24, and the power supply capability of the power supply resource pool formed by all the variable power supply units 23 configured in the telecommunications equipment is sufficient, that is, for each fixed power distribution unit 21 of the fixed power distribution units with surplus power supply capabilities, a difference between output power of the fixed power distribution unit 21, which is reported by a first power supply reporting module 25 configured for the fixed power distribution unit 21, and the sum of the rated power of the fixed loads 222 in all the fixed configuration units 22 located in the same section as the fixed configuration unit 22 is greater than zero, and the difference is less than the rated power of the variable load 242 whose rated power is changed, and the sum of the output power of all the variable power supply units 23 is greater than or equal to the sum of the rated power of all the variable loads 242 (where all the variable loads 242 include the variable load whose rated power is changed); or, the sum of the output power of all the variable power supply units 23 is greater than or equal to the sum of the rated power of all the variable loads 242 (where all the variable loads 242 include the variable load whose rated power is changed), the centralized management unit 27 determines a second trigger instruction (where the second trigger instruction is used to instruct the second load monitoring module 243 to control the second selection module 244 to select, from the output voltage of the fixed power distribution unit 21 and the output voltage of the variable power supply unit 23, the output voltage of the variable power supply unit 23 as the input voltage of the variable configuration unit 24), and transmits the second trigger instruction to the second load monitoring module 243 in the variable configuration unit 24, so that the second load monitoring module 243 controls, according to the second trigger instruction, the second selection module 244 to select the output voltage of variable power supply unit 23 as the input voltage of the variable configuration unit 24, to provide power supply to the variable load 242.

If there is a surplus of the power supply capability of the fixed power distribution unit 21, that is, the difference between the output power of the fixed power distribution unit 21, which is reported by the first power supply reporting module 25 configured for the fixed power distribution unit 21, and the sum of the rated power of the fixed loads 222 in all the fixed configuration units 22 located in the same section as the fixed configuration unit 22 is greater than zero, and the difference is greater than or equal to the rated power of the variable load 242 (where the rated power of the variable load 242 is the changed rated power), and the power supply capability of the power supply resource pool formed by all the variable power supply units 23 configured in the telecommunications equipment is sufficient, that is, the sum of the output power of all the variable power supply units 23 is greater than or equal to the sum of the rated power of all the variable loads 242 (where the rated power of the variable load 242 is the changed rated power), the centralized management unit 27 determines a second trigger instruction (where the second trigger instruction is used to instruct the second load monitoring module 243 to control the second selection module 244 to preferably select, from the output voltage of the fixed power distribution unit 21 and the output voltage of the variable power supply unit 23, the output voltage of the fixed power distribution unit 21 as the input voltage of the variable configuration unit 24), and transmits the second trigger instruction to the second load monitoring module 243 in the variable configuration unit 24 in which the variable load 242 is located, so that the second load monitoring module 243 controls, according to the second trigger instruction, the second selection module 244 to preferably select the output voltage of the fixed power distribution unit 21 as the input voltage of the variable configuration unit 24, that is, select the fixed power distribution unit 21 to provide power supply to the variable load 242.

If there is no surplus of power supply capabilities of all the fixed power distribution units 21 included in the telecommunications equipment, and the power supply capability of the power supply resource pool formed by all the variable power supply units 23 configured in the telecommunications equipment is sufficient, that is, for each fixed power distribution unit 21 of all the fixed power distribution units 21 included in the telecommunications equipment, a difference between output power of the fixed power distribution unit 21, which is reported by a first power supply reporting module 25 configured for the fixed power distribution unit 21, and the sum of the rated power of the fixed loads 222 in all the fixed configuration units 22 located in the same section as the fixed configuration unit 22 is equal to zero, and the sum of the output power of all the variable power supply units 23 is greater than or equal to the sum of the rated power of all the variable loads 242, the centralized management unit 27 determines a second trigger instruction (where the second trigger instruction is used to instruct the second load monitoring module 243 to control the second selection module 244 to select, from the output voltage of the fixed power distribution unit 21 and the output voltage of the variable power supply unit 23, the output voltage of the variable power supply unit 23 as the input voltage of the variable configuration unit 24), and transmits the second trigger instruction to the second load monitoring module 243 in the variable configuration unit 24, so that the second load monitoring module 243 controls, according to the second trigger instruction, the second selection module 244 to select the output voltage of variable power supply unit 23 as the input voltage of the variable configuration unit 24, to provide power supply to the variable load 242.

If the output power of the fixed power distribution unit 21 and the sum of the rated power of all the fixed loads 222 corresponding to the fixed power distribution unit 21 located in the same section is not greater than zero, and the difference is less than the rated power of the variable load 242, but the power supply capability of the power supply resource pool formed by all the variable power supply units 23 configured in the telecommunications equipment is insufficient (that is, the sum of the output power of all the variable power supply units 23 is less than the sum of the rated power of all the variable loads 242); or, if differences between the output power of each fixed power distribution unit 21 of the at least one fixed power distribution unit 21 included in the telecommunications equipment and the sum of the rated power of all the fixed loads 222 corresponding to the fixed power distribution unit 21 located in the same section are all equal to zero, but the power supply capability of the power supply resource pool formed by all the variable power supply units 23 configured in the telecommunications equipment is insufficient, power supply to the variable load 242 whose rated power is changed or the added variable load 242 may be implemented by adding a variable power supply unit 23. Specifically, in a possible implementation manner, the number of variable power supply units 23 that need to be added may be obtained through calculation according to a sum of rated power of some loads (where the loads include the variable load 242 whose rated power is changed and all variable loads 242 (other than the variable load 242 whose rated power is changed) included in telecommunications equipment before the rated power of the variable load 242 is changed, or includes the added variable load 242 and all the variable loads 242 included in telecommunications equipment before the variable load 242 is added) currently included in the telecommunications equipment. For a specific calculation method, refer to the method for calculating the number of variable power supply units 23 in this embodiment of the present invention, and details are not described herein again in this embodiment of the present invention. In another possible implementation manner, the number of variable power supply units 23 that need to be added may be obtained through calculation according to the rated power of the variable load 242 whose rated power is changed or according to rated power of the added variable load 242. For a specific calculation method, refer to the method for calculating the number of variable power supply units 23 in this embodiment of the present invention, and details are not described herein again in this embodiment of the present invention.

Further optionally, while the fixed configuration unit 22 in the telecommunications equipment includes the first load monitoring module 223 and the first selection module 224, the variable configuration unit 24 may also include a second load monitoring module 243 and a second selection module 244. In this case, when a variable load 242 in a variable configuration unit 24 needs to be replaced or a variable configuration unit 24 (including a variable load 242) needs to be added, which causes a change to a sum of rated power of all variable loads 242 included in the telecommunications equipment, if it is ultimately determined that a fixed power distribution unit 21 provides power supply to the variable configuration unit 24 that needs replacement or the variable configuration unit 24 that needs to be added, after the fixed power distribution unit 21 provides power supply to both a fixed configuration unit 22 and a variable configuration unit 24 that are in a corresponding section, when a fixed load 222 in a fixed configuration unit in this section needs to be replaced, which causes a change to rated power of the fixed load 222, and the rated power of the fixed load 222 after replacement is less than or equal to rated power of the variable configuration unit 24, the centralized management unit may control a second selection module 244 of the variable configuration unit 24 to use the output voltage of the variable power supply unit 23 as an input voltage of the variable configuration unit 24, and the centralized management unit 27 controls a first selection module 224 of the fixed configuration unit 22 with replacement to use an output voltage of the fixed power distribution unit 21 as an input voltage of the fixed configuration unit 22 with replacement.

It should be noted that, for specific processes during which the centralized management unit 27 controls the first selection module 224 in the fixed configuration unit 22 and the second selection module 244 in the variable configuration unit 24, refer to specific descriptions of corresponding content in this embodiment of the present invention, and details are not described herein again in this embodiment of the present invention.

In summary, by implementing sharing of power supply provided to the fixed configuration unit 22 or the variable configuration unit 24 by the fixed power distribution unit 21 and the variable power supply unit 23, power supply utilization of the fixed power distribution unit 21 may be further improved, and a power requirement of future evolution of the telecommunications equipment may be met.

It should be noted that, in this embodiment of the present invention, the control bus may be a common control bus, such as an inter-integrated circuit (Inter-Integrated Circuit, I2C) bus, a serial peripheral interface (Serial Peripheral Interface, SPI) bus, or a controller area network (Controller Area Network, CAN) bus.

This embodiment of the present invention provides a telecommunications equipment, where the telecommunications equipment includes at least one fixed power distribution unit, at least one fixed configuration unit, at least one variable power supply unit, and at least one variable configuration unit. All loads are differentiated, the fixed power distribution unit provides power supply to a load that must be configured in the telecommunications equipment, and the variable power supply unit provides power supply to another load, other than a fixed load, that is configured in the telecommunications equipment. This not only avoids a problem of a waste of resources caused when only the fixed power distribution unit provides power supply to all the loads and power distribution of all the loads needs to be connected during initial configuration, but also avoids a problem of an increase in power supply costs caused when only the variable power supply unit is used to provide power supply to all the loads and a power supply unit needs to be configured for each power supply voltage input to provide power supply to all the loads, that is, the telecommunications equipment provided in the present invention improves utilization of a power supply resource, and reduces power supply costs.

In addition, to adapt to device upgrade and expansion requirements, a large surplus is designed for a power supply capability provided by a fixed power distribution unit of the telecommunications equipment. In this embodiment of the present invention, a centralized management unit is disposed in the telecommunications equipment to monitor power supply capabilities provided by the fixed power distribution unit and the variable power supply unit, and monitor power requirements of the fixed configuration unit and the variable configuration unit; and a first selection module is disposed in the fixed configuration unit and a second selection module is disposed in the variable configuration unit, to implement sharing of power supply provided to the fixed configuration unit or the variable configuration unit by the fixed power distribution unit and the variable power supply unit, which further improves utilization of a power supply resource, and meets a power requirement of future evolution of the telecommunications equipment.

Embodiment 3

Figure 9:
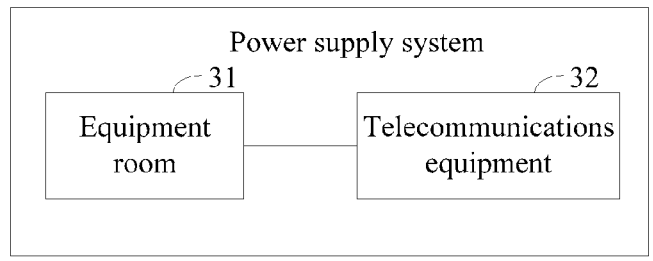
FIG. 9 is a schematic diagram of composition of a power supply system according to Embodiment 3 of the present invention.

Embodiment 3 of the present invention provides a power supply system. As shown in FIG. 9, the power supply system may include: an equipment room 31 and a telecommunications equipment 32.

The equipment room 31 is configured to input a power supply voltage to the telecommunications equipment 32.

The telecommunications equipment 32 includes: at least one fixed power distribution unit, at least one fixed configuration unit, at least one variable power supply unit, and at least one variable configuration unit.

The fixed power distribution unit is corresponding to the fixed configuration unit located in a same section, and an input end of each fixed configuration unit of the at least one fixed configuration unit is connected to an output end of a corresponding fixed power distribution unit; and output ends of all the variable power supply units are connected, and an input end of each variable configuration unit of the at least one variable configuration unit is connected to an output end of the variable power supply unit.

The fixed power distribution unit is configured to transmit a power supply voltage to the corresponding fixed configuration unit located in the same section.

The fixed configuration unit includes a first load power supply module and a fixed load, where the first load power supply module is configured to perform processing on a voltage that is output by the fixed power distribution unit, to obtain a voltage required for the fixed load to work normally, and input the voltage required for the fixed load to work normally to the fixed load; and the fixed load is a load that must be configured in the telecommunications equipment.

The variable power supply unit is configured to convert a power supply voltage into a stable direct current voltage.

The variable configuration unit includes a second load power supply module and a variable load, where the second load power supply module is configured to perform processing on the direct current voltage that is output by the variable power supply unit, to obtain a voltage required for the variable load to work normally, and input the voltage required for the variable load to work normally to the variable load; and the variable load is another load, other than the fixed load, that is configured in the telecommunications equipment.

This embodiment of the present invention provides a power supply system, where the power supply system may include: an equipment room and a telecommunications equipment, where the telecommunications equipment includes at least one fixed power distribution unit, at least one fixed configuration unit, at least one variable power supply unit, and at least one variable configuration unit. All loads are differentiated, the fixed power distribution unit provides power supply to a load that must be configured in the telecommunications equipment, and the variable power supply unit provides power supply to another load, other than a fixed load, that is configured in the telecommunications equipment. This not only avoids a problem of a waste of resources caused when only the fixed power distribution unit provides power supply to all the loads and power distribution of all the loads needs to be connected during initial configuration, but also avoids a problem of an increase in power supply costs caused when only the variable power supply unit is used to provide power supply to all the loads and a power supply unit needs to be configured for each power supply voltage input to provide power supply to all the loads, that is, the telecommunications equipment provided in the present invention improves utilization of a power supply resource, and reduces power supply costs.

In addition, to adapt to device upgrade and expansion requirements, a large surplus is designed for a power supply capability provided by a fixed power distribution unit of the telecommunications equipment. In this embodiment of the present invention, a centralized management unit is disposed in the telecommunications equipment to monitor power supply capabilities provided by the fixed power distribution unit and the variable power supply unit, and monitor power requirements of the fixed configuration unit and the variable configuration unit; and a first selection module is disposed in the fixed configuration unit and a second selection module is disposed in the variable configuration unit, to implement sharing of power supply provided to the fixed configuration unit or the variable configuration unit by the fixed power distribution unit and the variable power supply unit, which further improves utilization of a power supply resource, and meets a power requirement of future evolution of the telecommunications equipment.

Embodiment 4

Embodiment 4 of the present invention provides a power supply implementation method, which is applied to a telecommunications equipment, where the telecommunications equipment includes at least one fixed power distribution unit, at least one fixed configuration unit, at least one variable power supply unit, and at least one variable configuration unit, where the fixed power distribution unit is corresponding to the fixed configuration unit located in a same section, and an input end of each fixed configuration unit of the at least one fixed configuration unit is connected to an output end of a corresponding fixed power distribution unit; output ends of all the variable power supply units are connected, and an input end of each variable configuration unit of the at least one variable configuration unit is connected to an output end of the variable power supply unit; the fixed configuration unit includes a first load power supply module and a fixed load; and the variable configuration unit includes a second load power supply module and a variable load.

It should be noted that, in the power supply implementation method provided in this embodiment of the present invention, the number of fixed power distribution units, fixed configuration units, variable power supply units, and variable configuration units that need to be included in the telecommunications equipment may be configured according to a requirement of an actual application scenario; and this embodiment of the present invention does not set a specific limitation to the number of the fixed power distribution units, the fixed configuration units, the variable power supply units, and the variable configuration units that need to be included in the telecommunications equipment.

Figure 10:
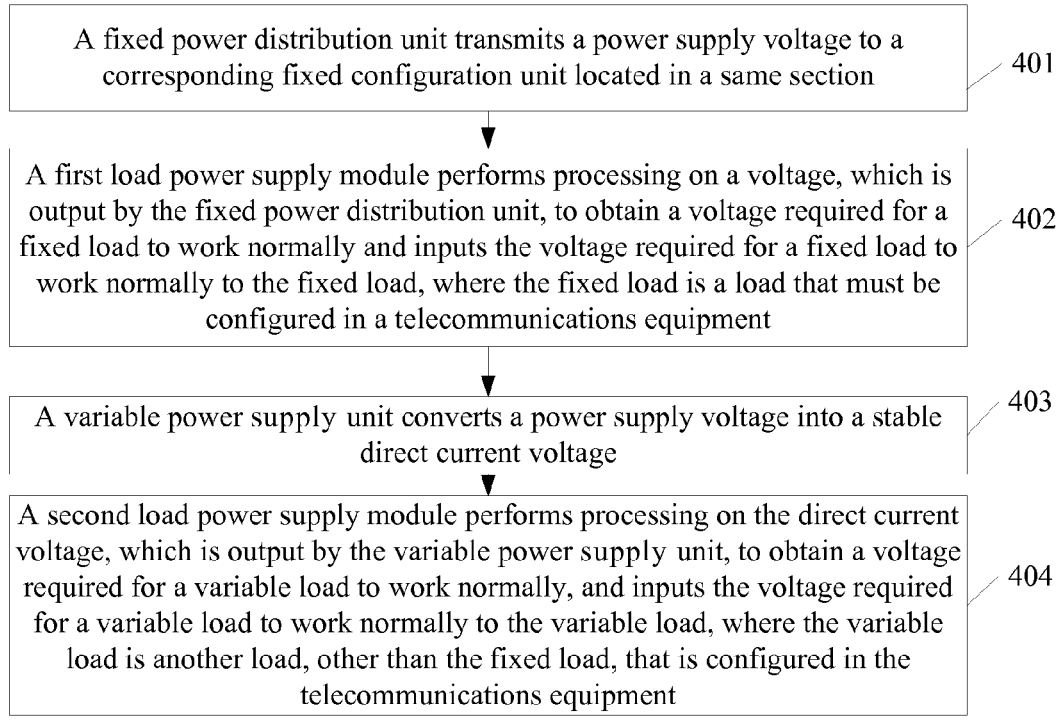
FIG. 10 is a schematic flowchart of a power supply implementation method according to Embodiment 4 of the present invention.

As shown in FIG. 10, the power supply implementation method may include:

401. The fixed power distribution unit transmits a power supply voltage to the corresponding fixed configuration unit located in the same section.

It should be noted that, in this embodiment of the present invention, an equipment room may provide a power supply voltage to the fixed power distribution unit in the telecommunications equipment, and this embodiment of the present invention does not set a limitation herein to a specific device that provides a power supply voltage to the telecommunications equipment.

402. The first load power supply module performs processing on a voltage that is output by the fixed power distribution unit, to obtain a voltage required for the fixed load to work normally, and inputs the voltage required for the fixed load to work normally to the fixed load, where the fixed load is a load that must be configured in the telecommunications equipment.

Configuration of the fixed load does not vary according to different deployed services and different application scenarios of the telecommunications equipment. That is, the loads configured in the telecommunications equipment, for example, a board, a cooling fan, or the like that must be configured in all application scenarios, are definite. Therefore, in different application scenarios, rated power of these fixed loads is constant, and a sum of rated power of all fixed loads included in the telecommunications equipment is also constant. In this case, when an equipment room provides a power supply voltage to the fixed power distribution unit in the telecommunications equipment, the number of power supply inputs that need to be provided by the equipment room and a power supply capability of each power supply branch circuit may be determined in advance according to the sum of the rated power of all the fixed loads that need to be included in the telecommunications equipment; and then, the number of power supply sections into which all the fixed loads need to be divided and the number of fixed loads included in each power supply section are determined according to the number of power supply inputs that need to be provided by the equipment room and the power supply capability of each power supply branch circuit, and a sum of rated power of all the fixed loads included in each power supply section is less than or equal to a power supply capability of a corresponding fixed power distribution unit. A same fixed power distribution unit provides power supply to all fixed loads included in a power supply section; and because all these fixed loads must be configured inside the telecommunications equipment, it can be ensured that a power supply resource provided by each power supply branch circuit is not wasted.

403. The variable power supply unit converts a power supply voltage into a stable direct current voltage.

It should be noted that, in this embodiment of the present invention, an equipment room may provide a power supply voltage to the variable power supply unit in the telecommunications equipment, and this embodiment of the present invention does not set a limitation herein to a specific device that provides a power supply voltage to the telecommunications equipment.

404. The second load power supply module performs processing on the direct current voltage that is output by the variable power supply unit, to obtain a voltage required for the variable load to work normally, and inputs the voltage required for the variable load to work normally to the variable load, where the variable load is another load, other than the fixed load, that is configured in the telecommunications equipment.

Because configuration of the variable load varies according to different deployed services or different application scenarios of the telecommunications equipment, in different application scenarios, rated power and the number of variable loads may change according to different deployed services or different application scenarios of the telecommunications equipment, that is, a sum of rated power of variable loads included in all variable configuration units may change. For example, for a service interface board in the telecommunications equipment, when deployed services are different, both types and the number of service interface boards that need to be installed in the telecommunications equipment are different. Because the rated power of the variable loads may change relatively greatly according to different application scenarios or different deployed services of the telecommunications equipment, in this embodiment of the present invention, a direct current voltage obtained after the variable power supply unit performs voltage regulation on a power supply voltage is used to provide power supply to the variable load.

To improve reliability of power supply of the telecommunications equipment and avoid service interruption of the telecommunications equipment caused when there is only one power supply branch circuit and the power supply branch circuit is faulty, generally, two power supply voltage inputs are led in as power supply inputs of one fixed power distribution unit in the telecommunications equipment, to implement mutual backup of the two power supply voltage inputs. Therefore, when two power supply voltage inputs are led in as power supply inputs of one fixed power distribution unit in the telecommunications equipment, further optionally, the fixed power distribution unit may include two power distribution subunits, where each of the power distribution subunits may include a first filtering protection module.

In step 401, that the fixed power distribution unit transmits the power supply voltage to the corresponding fixed configuration unit located in the same section may specifically include the following processing step:

the first filtering protection module performs filtering protection processing on the power supply voltage, and transmits a voltage after the processing to the corresponding fixed configuration unit located in the same section.

By performing the filtering protection processing on the power supply voltage, the first filtering protection module can filter out an interfering signal, thereby effectively preventing interference to the telecommunications equipment from a signal outside the telecommunications equipment; and when the telecommunications equipment is struck by lightning, with the filtering protection processing performed by the first filtering protection module, a residual voltage caused by lightning may not exceed a range of voltage that can be borne by the telecommunications equipment, to implement protection of the telecommunications equipment. In addition, the first filtering protection module may also prevent interference generated inside the telecommunications equipment from leaking out of the telecommunications equipment.

Further optionally, the power distribution subunit may further include: a first ORing module, where an input end of the first ORing module is connected to an output end of the first filtering protection module.

When a voltage that is output by the first filtering protection module that belongs to the same power distribution subunit as the first ORing module meets a preset condition, the first ORing module connects a connection between the power distribution subunit and the input end of the corresponding fixed configuration unit located in the same section, to transmit the voltage that is output by the first filtering protection module that belongs to the same power distribution subunit as the first ORing module, to the corresponding fixed configuration unit located in the same section.

The meeting a preset condition is that a difference between the output voltage of the first filtering protection module that belongs to the same power distribution subunit as the first ORing module and an output voltage of the first filtering protection module that does not belong to the same power distribution subunit as the first ORing module is greater than or equal to a preset threshold.

The preset threshold represents a critical value, which connects the connection between the power distribution subunit and the input end of the corresponding fixed configuration unit located in the same section, of the difference between the output voltage of the first filtering protection module that belongs to the power distribution subunit and the output voltage of the first filtering protection module that does not belong to the power distribution subunit.

Further optionally, to improve reliability of power supply of the telecommunications equipment and avoid service interruption of the telecommunications equipment caused when there is only one power supply branch circuit and the power supply branch circuit is faulty, two power supply voltage inputs may also be led in as power supply inputs of one variable power supply unit in the telecommunications equipment, to implement mutual backup of the two power supply voltage inputs. When two power supply voltage inputs may also be led in as power supply inputs of one variable power supply unit in the telecommunications equipment, in a possible implementation manner, the variable power supply unit may include two first power supply subunits, and each of the first power supply subunits may include a second filtering protection module and a direct current converting module, where an output end of the second filtering protection module is connected to an input end of the direct current converting module, and an output end of the direct current converting module is an output end of the variable power supply unit.

In step 403, that the variable power supply unit converts a power supply voltage into a stable direct current voltage may specifically include the following processing steps:

the second filtering protection module performs filtering protection processing on a power supply voltage input; and the direct current converting module converts a voltage that is output by the second filtering protection module into a stable direct current voltage.

By performing the filtering protection processing on the power supply voltage, the second filtering protection module can filter out an interfering signal, thereby effectively preventing interference to the telecommunications equipment from a signal outside the telecommunications equipment; and when the telecommunications equipment is struck by lightning, with the filtering protection processing performed by the second filtering protection module, a residual voltage caused by lightning may not exceed a range of voltage that can be borne by the telecommunications equipment, to implement protection of the telecommunications equipment. In addition, the second filtering protection module may also prevent interference generated inside the telecommunications equipment from leaking out of the telecommunications equipment.

Further optionally, when two power supply inputs are provided to one variable power supply unit to improve reliability of power supply of the telecommunications equipment, in a possible implementation manner, the variable power supply unit may further include a first power supply subunit, and the first power supply subunit includes a third filtering protection module, a second ORing module, and a direct current converting module, where an output end of the third filtering protection module is connected to an input end of the second ORing module, an output end of the second ORing module is connected to an input end of the direct current converting module, and an output end of the direct current converting module is an output end of the variable power supply unit.

In step 403, that the variable power supply unit converts a power supply voltage into a stable direct current voltage may specifically include the following processing steps:

the third filtering protection module performs filtering protection processing on two power supply voltage inputs;

the second ORing module converts two voltage inputs that are output by the third filtering protection module into one voltage input, and outputs the one voltage input; and the direct current converting module converts a voltage that is output by the second ORing module into a stable direct current voltage.

Further optionally, the telecommunications equipment may further include: a first power supply reporting module, a second power supply reporting module, and a centralized management unit; the fixed configuration unit may further include a first load monitoring module and a first selection module; and the variable configuration unit may further include a second load monitoring module, where an input end of the first selection module is separately connected to the output end of the fixed power distribution unit and the output end of the variable power supply unit, an output end of the first selection module is connected to an input end of the first load power supply module, and the first selection module is connected to the first load monitoring module.

The power supply implementation method may further include that:

the first power supply reporting module acquires output power of the fixed power distribution unit, and reports the output power of the fixed power distribution unit to the centralized management unit;

the second power supply reporting module acquires output power of the variable power supply unit, and reports the output power of the variable power supply unit to the centralized management unit;

the first load monitoring module monitors rated power of the fixed load, and reports the rated power of the fixed load to the centralized management unit;

the first selection module selects, from an output voltage of the fixed power distribution unit and an output voltage of the variable power supply unit according to a control operation of the first load monitoring module, a voltage input as an input voltage of the fixed configuration unit;

the second load monitoring module monitors rated power of the variable load, and reports the rated power of the variable load to the centralized management unit; and the centralized management unit determines a first trigger instruction according to the output power of the fixed power distribution unit, the output power of the variable power supply unit, the rated power of the fixed load, and the rated power of the variable load; and transmits the first trigger instruction to the first load monitoring module, where the first trigger instruction is used to instruct the first load monitoring module to control the first selection module to select, from the output voltage of the fixed power distribution unit and the output voltage of the variable power supply unit, the output voltage of the fixed power distribution unit or the output voltage of the variable power supply unit as the input voltage of the fixed configuration unit, where:

when there is a surplus of the output power of the fixed power distribution unit, the first trigger instruction is used to instruct the first load monitoring module to control the first selection module to select the output voltage of the fixed power distribution unit as the input voltage of the fixed configuration unit; or when there is a surplus of the output power of the variable power supply unit, the first trigger instruction is used to instruct the first load monitoring module to control the first selection module to select the output voltage of the variable power supply unit as the input voltage of the fixed configuration unit; or when there is a surplus of both the output power of the fixed power distribution unit and the output power of the variable power supply unit, the first trigger instruction is used to instruct the first load monitoring module to control the first selection module to preferably select the output voltage of the fixed power distribution unit as the input voltage of the fixed configuration unit.

Further optionally, the first trigger instruction may be determined according to the following conditions:

when a sum of rated power of all the fixed loads corresponding to the fixed power distribution unit located in the same section is less than or equal to the output power of the fixed power distribution unit, the first trigger instruction is used to instruct the first load monitoring module to control the first selection module to select, from the output voltage of the fixed power distribution unit and the output voltage of the variable power supply unit, the output voltage of the fixed power distribution unit as the input voltage of the fixed configuration unit; or when a sum of rated power of all the fixed loads corresponding to the fixed power distribution unit located in the same section is greater than the output power of the fixed power distribution unit, and a sum of output power of all the variable power supply units is greater than or equal to a sum of rated power of all the variable loads and the rated power of all the fixed loads; or when a sum of output power of all the variable power supply units is greater than or equal to a sum of rated power of all the variable loads and the rated power of all the fixed loads, the first trigger instruction is used to instruct the first load monitoring module to control the first selection module to select, from the output voltage of the fixed power distribution unit and the output voltage of the variable power supply unit, the output voltage of the variable power supply unit as the input voltage of the fixed configuration unit; or when a sum of rated power of all the fixed loads corresponding to the fixed power distribution unit located in the same section is less than or equal to the output power of the fixed power distribution unit, and a sum of output power of all the variable power supply units is greater than or equal to a sum of rated power of all the variable loads and the rated power of all the fixed loads, the first trigger instruction is used to instruct the first load monitoring module to control the first selection module to preferably select, from the output voltage of the fixed power distribution unit and the output voltage of the variable power supply unit, the output voltage of the fixed power distribution unit as the input voltage of the fixed configuration unit.

Further optionally, the telecommunications equipment may further include: a first power supply reporting module, a second power supply reporting module, and a centralized management unit; the fixed configuration unit may further include: a first load monitoring module; and the variable configuration unit may further include: a second load monitoring module and a second selection module, where an input end of the second selection module is separately connected to the output end of the fixed power distribution unit and the output end of the variable power supply unit, an output end of the second selection module is connected to an input end of the second load power supply module, and the second selection module is connected to the second load monitoring module.

The power supply implementation method may further include that:

the first power supply reporting module acquires output power of the fixed power distribution unit, and reports the output power of the fixed power distribution unit to the centralized management unit;

the second power supply reporting module acquires output power of the variable power supply unit, and reports the output power of the variable power supply unit to the centralized management unit;

the second load monitoring module monitors rated power of the variable load, and reports the rated power of the variable load to the centralized management unit;

the second selection module is configured to select, from an output voltage of the fixed power distribution unit and an output voltage of the variable power supply unit according to a control operation of the second load monitoring module, a voltage input as an input voltage of the variable configuration unit;

the first load monitoring module monitors rated power of the fixed load, and reports the rated power of the fixed load to the centralized management unit; and the centralized management unit determines a second trigger instruction according to the output power of the fixed power distribution unit, the output power of the variable power supply unit, the rated power of the fixed load, and the rated power of the variable load; and transmits the second trigger instruction to the second load monitoring module, where the second trigger instruction is used to instruct the second load monitoring module to control the second selection module to select, from the output voltage of the fixed power distribution unit and the output voltage of the variable power supply unit, the output voltage of the fixed power distribution unit or the output voltage of the variable power supply unit as the input voltage of the variable configuration unit, where:

when there is a surplus of the output power of the fixed power distribution unit, the second trigger instruction is used to instruct the second load monitoring module to control the second selection module to select the output voltage of the fixed power distribution unit as the input voltage of the variable configuration unit; or when there is a surplus of the output power of the variable power supply unit, the second trigger instruction is used to instruct the second load monitoring module to control the second selection module to select the output voltage of the variable power supply unit as the input voltage of the variable configuration unit; or when there is a surplus of both the output power of the fixed power distribution unit and the output power of the variable power supply unit, the second trigger instruction is used to instruct the second load monitoring module to control the second selection module to preferably select the output voltage of the fixed power distribution unit as the input voltage of the variable configuration unit.

Further optionally, the second trigger instruction may be determined according to the following conditions:

when a difference between the output power of the fixed power distribution unit and a sum of rated power of all the fixed loads corresponding to the fixed power distribution unit located in the same section is greater than zero, and the difference is greater than or equal to the rated power of the variable load, the second trigger instruction is used to instruct the second load monitoring module to control the second selection module to select, from the output voltage of the fixed power distribution unit and the output voltage of the variable power supply unit, the output voltage of the fixed power distribution unit as the input voltage of the variable configuration unit; or when a difference between the output power of the fixed power distribution unit and a sum of rated power of all the fixed loads corresponding to the fixed power distribution unit located in the same section is greater than zero, the difference is less than the rated power of the variable load, and a sum of output power of all the variable power supply units is greater than or equal to a sum of rated power of all the variable loads; or when differences between output power of each fixed power distribution unit of the at least one fixed power distribution unit included in the telecommunications equipment and the sum of the rated power of all the fixed loads corresponding to the fixed power distribution unit located in the same section are all equal to zero, and a sum of output power of all the variable power supply units is greater than or equal to a sum of rated power of all the variable loads; or when a sum of output power of all the variable power supply units is greater than or equal to a sum of rated power of all the variable loads, the second trigger instruction is used to instruct the second load monitoring module to control the second selection module to select, from the output voltage of the fixed power distribution unit and the output voltage of the variable power supply unit, the output voltage of the variable power distribution unit as the input voltage of the variable configuration unit; or when a difference between the output power of the fixed power distribution unit and a sum of rated power of all the fixed loads corresponding to the fixed power distribution unit located in the same section is greater than zero, the difference is greater than or equal to the rated power of the variable load, and a sum of output power of all the variable power supply units is greater than or equal to a sum of rated power of all the variable loads, the second trigger instruction is used to instruct the second load monitoring module to control the second selection module to preferably select, from the output voltage of the fixed power distribution unit and the output voltage of the variable power supply unit, the output voltage of the fixed power distribution unit as the input voltage of the variable configuration unit.

It should be noted that, in this embodiment of the present invention, a sequence of executing step 401 to step 402 and executing step 403 to step 404 is not limited. It may be that step 401 to step 402 are executed before step 403 to step 404, or it may be that step 403 to step 404 are executed before step 401 to step 402. Certainly, it may further be that, step 401 to step 402 and step 403 to step 404 are executed simultaneously. This embodiment of the present invention does not set a specific limitation to the sequence of executing step 401 to step 402 and executing step 403 to step 404.

It should be noted that, the power supply implementation method provided in this embodiment of the present invention is mainly applied to the telecommunications equipment provided in Embodiment 1 and Embodiment 2 of the present invention. For specific implementation of the power supply method in this embodiment of the present invention, refer to specific descriptions of corresponding content in Embodiment 1 and Embodiment 2 of the present invention, and details are not described herein again in this embodiment of the present invention.

In the power supply implementation method provided in this embodiment of the present invention, all loads are differentiated, a power supply voltage that is input by an equipment room is used to provide power supply to a fixed load, and the power supply voltage provided by the equipment room is converted into a stable direct current voltage, and the stable direct current voltage is used to provide power supply to a variable load. This not only avoids a problem of a waste of resources caused when power distribution of all the loads needs to be connected during initial configuration, but also avoids a problem of an increase in power supply costs caused when a power supply unit needs to be configured for each power supply voltage input to provide power supply to all the loads, that is, the telecommunications equipment provided in the present invention improves utilization of a power supply resource, and reduces power supply costs.

In addition, to adapt to device upgrade and expansion requirements, a large surplus is designed for a power supply capability provided by a fixed power distribution unit of the telecommunications equipment. In this embodiment of the present invention, a centralized management unit is disposed in the telecommunications equipment to monitor power supply capabilities provided by the fixed power distribution unit and the variable power supply unit, and monitor power requirements of the fixed configuration unit and the variable configuration unit; and a first selection module is disposed in the fixed configuration unit and a second selection module is disposed in the variable configuration unit, to implement sharing of power supply provided to the fixed configuration unit or the variable configuration unit by the fixed power distribution unit and the variable power supply unit, which further improves utilization of a power supply resource, and meets a power requirement of future evolution of the telecommunications equipment.

Through the description of the foregoing implementation manners, it may be clearly understood by a person skilled in the art that, for the purpose of convenient and brief description, division of the foregoing function modules is taken as an example for illustration. In actual application, the foregoing functions can be allocated to different function modules as required, that is, an inner structure of an apparatus is divided into different function modules to implement all or some of the functions described above. For a detailed working process of the foregoing apparatus, refer to a corresponding process in the foregoing method embodiments, and details are not described herein again.

In the several embodiments provided in the present application, it should be understood that the disclosed apparatus and method may be implemented in other manners. For example, the foregoing described apparatus embodiment is merely illustrative. For example, the module or unit division is merely logical function division and there may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one physical unit or multiple physical units, that is, they may be located in one position, or may be distributed in different positions. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in a form of a software product. The computer software product is stored in a storage medium, and includes several instructions for instructing a device (which may be a single-chip microcomputer or a chip) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limitation the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A telecommunications equipment, comprising: at least one fixed power distribution unit, at least one fixed configuration unit, at least one variable power supply unit, and at least one variable configuration unit, wherein:
a fixed power distribution unit of the at least one fixed power distribution unit is associated with a fixed configuration unit located in a same section and of the at least one fixed configuration unit, and an input end of each fixed configuration unit of the at least one fixed configuration unit is connected to an output end of a corresponding fixed power distribution unit of the at least one fixed power distribution unit; and output ends of all the at least one variable power supply units are connected, and an input end of each variable configuration unit of the at least one variable configuration unit is connected to an output end of the at least one variable power supply unit;
the at least one fixed power distribution unit is configured to transmit a power supply voltage to a corresponding fixed configuration unit located in the same section and of the at least one fixed power distribution unit;
the at least one fixed configuration unit comprises a first load power supply module and a fixed load, wherein the first load power supply module is configured to perform processing on a voltage that is output by the corresponding fixed power distribution unit, to obtain a voltage required for the fixed load to work normally, and input the voltage required for the fixed load to work normally to the fixed load; and the fixed load is a load that must be configured in the telecommunications equipment;
the at least one variable power supply unit is configured to convert a power supply voltage into a stable direct current voltage; and
the at least one variable configuration unit comprises a second load power supply module and a variable load, wherein the second load power supply module is configured to perform processing on the direct current voltage that is output by the at least one variable power supply unit, to obtain a voltage required for the variable load to work normally, and input the voltage required for the variable load to work normally to the variable load; and the variable load is another load, other than the fixed load, that is configured in the telecommunications equipment.

2. The telecommunications equipment according to claim 1, wherein:
the at least one fixed power distribution unit comprises two power distribution subunits, and each of the power distribution subunits comprises a first filtering protection module, configured to perform filtering protection processing on the power supply voltage and transmit a voltage after the processing to the corresponding fixed configuration unit located in the same section.

3. The telecommunications equipment according to claim 2, wherein:
the power distribution subunit further comprises a first ORing module, wherein an input end of the first ORing module is connected to an output end of the first filtering protection module; and the first ORing module is configured to: when a voltage that is output by the first filtering protection module that belongs to the same power distribution subunit as the first ORing module meets a preset condition, connect a connection between the power distribution subunit and the input end of the corresponding fixed configuration unit located in the same section, to transmit the voltage that is output by the first filtering protection module that belongs to the same power distribution subunit as the first ORing module to the corresponding fixed configuration unit located in the same section, wherein:
the meeting a preset condition is that a difference between the output voltage of the first filtering protection module that belongs to the same power distribution subunit as the first ORing module and an output voltage of the first filtering protection module that does not belong to the same power distribution subunit as the first ORing module is greater than or equal to a preset threshold; and
the preset threshold represents a critical value, which connects the connection between the power distribution subunit and the input end of the corresponding fixed configuration unit located in the same section, of the difference between the output voltage of the first filtering protection module that belongs to the power distribution subunit and the output voltage of the first filtering protection module that does not belong to the power distribution subunit.

4. The telecommunications equipment according to claim 1, wherein:
the at least one variable power supply unit comprises two first power supply subunits, and each of the first power supply subunits comprises a second filtering protection module and a direct current converting module, wherein an output end of the second filtering protection module is connected to an input end of the direct current converting module, and an output end of the direct current converting module is an output end of the at least one variable power supply unit, wherein:
the second filtering protection module is configured to perform filtering protection processing on a power supply voltage input; and
the direct current converting module is configured to convert a voltage that is output by the second filtering protection module into a stable direct current voltage.

5. The telecommunications equipment according to claim 4, wherein:
there are N variable power supply units, a sum of rated power of all the variable loads is P, and rated output power of the first power supply subunit is Q; when P/Q is an integer, N =P/Q; and when P/Q is not an integer, N =floor(P/Q) +1.

6. The telecommunications equipment according to claim 1, wherein:
the at least one variable power supply unit comprises a first power supply subunit, and the first power supply subunit comprises a third filtering protection module, a second ORing module, and a direct current converting module, wherein an output end of the third filtering protection module is connected to an input end of the second ORing module, an output end of the second ORing module is connected to an input end of the direct current converting module, and an output end of the direct current converting module is an output end of the at least one variable power supply unit, wherein:
the third filtering protection module is configured to perform filtering protection processing on two power supply voltage inputs;

the second ORing module is configured to convert two voltage inputs that are output by the third filtering protection module into one voltage input, and output the one voltage input; and the direct current converting module is configured to convert a voltage that is output by the second ORing module into a stable direct current voltage.

7. The telecommunications equipment according to claim 6, wherein:

there are N+m variable power supply units, a sum of rated power of all the variable loads is P, and rated output power of the first power supply subunit is Q; when P/Q is an integer, N =P/Q; and when P/Q is not an integer, N =floor(P/Q) +1, wherein m is an integer greater than or equal to 0 and less than or equal to N; and the m variable power supply units of the N+m variable power supply units are backup power supply units of the N variable power supply units.

8. The telecommunications equipment according to claim 1, wherein:

the telecommunications equipment further comprises: a first power supply reporting module, a second power supply reporting module, and a centralized management unit, wherein:

the first power supply reporting module is configured to acquire output power of the at least one fixed power distribution unit, and report the output power of the at least one fixed power distribution unit to the centralized management unit; and the second power supply reporting module is configured to acquire output power of the at least one variable power supply unit and report the output power of the at least one variable power supply unit to the centralized management unit;

the at least one fixed configuration unit further comprises a first load monitoring module, configured to monitor rated power of the fixed load and report the rated power of the fixed load to the centralized management unit; and a first selection module, wherein an input end of the first selection module is separately connected to the output end of the at least one fixed power distribution unit and the output end of the at least one variable power supply unit, an output end of the first selection module is connected to an input end of the first load power supply module, and the first selection module is connected to the first load monitoring module; and the first selection module is configured to select, from an output voltage of the at least one fixed power distribution unit and an output voltage of the at least one variable power supply unit according to a control operation of the first load monitoring module, a voltage input as an input voltage of the at least one fixed configuration unit;

the at least one variable configuration unit further comprises: a second load monitoring module, configured to monitor rated power of the variable load and report the rated power of the variable load to the centralized management unit;

the centralized management unit is configured to determine a first trigger instruction according to the output power of the at least one fixed power distribution unit, the output power of the at least one variable power supply unit, the rated power of the fixed load, and the rated power of the variable load, and transmit the first trigger instruction to the first load monitoring module, wherein the first trigger instruction is used to instruct the first load monitoring module to control the first selection module to select, from the output voltage of the at least one fixed power distribution unit and the output voltage of the at least one variable power supply unit, the output voltage of the at least one fixed power distribution unit or the output voltage of the at least one variable power supply unit as the input voltage of at least one the fixed configuration unit, wherein:

when there is a surplus of the output power of the at least one fixed power distribution unit, the first trigger instruction is used to instruct the first load monitoring module to control the first selection module to select the output voltage of the at least one fixed power distribution unit as the input voltage of the at least one fixed configuration unit; or when there is a surplus of the output power of the at least one variable power supply unit, the first trigger instruction is used to instruct the first load monitoring module to control the first selection module to select the output voltage of the at least one variable power supply unit as the input voltage of the at least one fixed configuration unit; or when there is a surplus of both the output power of the at least one fixed power distribution unit and the output power of the at least one variable power supply unit, the first trigger instruction is used to instruct the first load monitoring module to control the first selection module to preferably select the output voltage of the at least one fixed power distribution unit as the input voltage of the at least one fixed configuration unit.

9. The telecommunications equipment according to claim 8, wherein:

when a sum of rated power of all fixed loads corresponding to the at least one fixed power distribution unit located in the same section is less than or equal to the output power of the at least one fixed power distribution unit, the first trigger instruction is used to instruct the first load monitoring module to control the first selection module to select, from the output voltage of the at least one fixed power distribution unit and the output voltage of the at least one variable power supply unit, the output voltage of the at least one fixed power distribution unit as the input voltage of the at least one fixed configuration unit; or when a sum of rated power of all fixed loads corresponding to the at least one fixed power distribution unit located in the same section is greater than the output power of the at least one fixed power distribution unit, and a sum of output power of all the at least one variable power supply units is greater than or equal to a sum of rated power of all the variable loads and the rated power of all the fixed loads; or when a sum of output power of all the at least one variable power supply units is greater than or equal to a sum of rated power of all the variable loads and the rated power of all the fixed loads, the first trigger instruction is used to instruct the first load monitoring module to control the first selection module to select, from the output voltage of the at least one fixed power distribution unit and the output voltage of the at least one variable power supply unit, the output voltage of the at least one variable power supply unit as the input voltage of the at least one fixed configuration unit; or when a sum of rated power of all fixed loads corresponding to the at least one fixed power distribution unit located in the same section is less than or equal to the output power of the at least one fixed power distribution unit, and a sum of output power of all the at least one variable power supply units is greater than or equal to a sum of rated power of all the variable loads and the rated power of all the fixed loads, the first trigger instruction is used to instruct the first load monitoring module to control the first selection module to preferably select, from the output voltage of the at least one fixed power distribution unit and the output voltage of the at least one variable power supply unit, the output voltage of the at least one fixed power distribution unit as the input voltage of the at least one fixed configuration unit.

10. The telecommunications equipment according to claim 1, wherein:

the telecommunications equipment further comprises: a first power supply reporting module, a second power supply reporting module, and a centralized management unit, wherein:

the first power supply reporting module is configured to acquire output power of the at least one fixed power distribution unit, and report the output power of the at least one fixed power distribution unit to the centralized management unit; and the second power supply reporting module is configured to acquire output power of the at least one variable power supply unit and report the output power of the at least one variable power supply unit to the centralized management unit;

the at least one fixed configuration unit further comprises a first load monitoring module, configured to monitor rated power of the fixed load and report the rated power of the fixed load to the centralized management unit;

the at least one variable configuration unit further comprises a second load monitoring module, configured to monitor rated power of the variable load and report the rated power of the variable load to the centralized management unit; and a second selection module, wherein an input end of the second selection module is separately connected to the output end of the at least one fixed power distribution unit and the output end of the at least one variable power supply unit, an output end of the second selection module is connected to an input end of the second load power supply module, and the second selection module is connected to the second load monitoring module; and the second selection module is configured to select, from an output voltage of the at least one fixed power distribution unit and an output voltage of the at least one variable power supply unit according to a control operation of the second load monitoring module, a voltage input as an input voltage of the at least one variable configuration unit;

the centralized management unit is configured to determine a second trigger instruction according to the output power of the at least one fixed power distribution unit, the output power of the at least one variable power supply unit, the rated power of the fixed load, and the rated power of the variable load, and transmit the second trigger instruction to the second load monitoring module, wherein the second trigger instruction is used to instruct the second load monitoring module to control the second selection module to select, from the output voltage of the at least one fixed power distribution unit and the output voltage of the at least one variable power supply unit, the output voltage of the at least one fixed power distribution unit or the output voltage of the at least one variable power supply unit as the input voltage of the at least one variable configuration unit, wherein:

when there is a surplus of the output power of the at least one fixed power distribution unit, the second trigger instruction is used to instruct the second load monitoring module to control the second selection module to select the output voltage of the at least one fixed power distribution unit as the input voltage of the at least one variable configuration unit; or when there is a surplus of the output power of the at least one variable power supply unit, the second trigger instruction is used to instruct the second load monitoring module to control the second selection module to select the output voltage of the at least one variable power supply unit as the input voltage of the at least one variable configuration unit; or when there is a surplus of both the output power of the at least one fixed power distribution unit and the output power of the at least one variable power supply unit, the second trigger instruction is used to instruct the second load monitoring module to control the second selection module to preferably select the output voltage of the at least one fixed power distribution unit as the input voltage of the at least one variable configuration unit.

11. The telecommunications equipment according to claim 10, wherein:

when a difference between the output power of the at least one fixed power distribution unit and a sum of rated power of all the fixed loads corresponding to the at least one fixed power distribution unit located in the same section is greater than zero, and the difference is greater than or equal to the rated power of the variable load, the second trigger instruction is used to instruct the second load monitoring module to control the second selection module to select, from the output voltage of the at least one fixed power distribution unit and the output voltage of the at least one variable power supply unit, the output voltage of the at least one fixed power distribution unit as the input voltage of the at least one variable configuration unit; or when a difference between the output power of the at least one fixed power distribution unit and a sum of rated power of all the fixed loads corresponding to the at least one fixed power distribution unit located in the same section is greater than zero, the difference is less than the rated power of the variable load, and a sum of output power of all the at least one variable power supply units is greater than or equal to a sum of rated power of all the variable loads; or when differences between output power of each fixed power distribution unit of the at least one fixed power distribution unit comprised in the telecommunications equipment and the sum of the rated power of all the fixed loads corresponding to the fixed power distribution unit located in the same section are all less than or equal to zero, and a sum of output power of all the at least one variable power supply units is greater than or equal to a sum of rated power of all the variable loads; or when a sum of output power of all the at least one variable power supply units is greater than or equal to a sum of rated power of all the variable loads, the second trigger instruction is used to instruct the second load monitoring module to control the second selection module to select, from the output voltage of the at least one fixed power distribution unit and the output voltage of the at least one variable power supply unit, the output voltage of the at least one variable power distribution unit as the input voltage of the at least one variable configuration unit; or when a difference between the output power of the at least one fixed power distribution unit and a sum of rated power of all the fixed loads corresponding to the fixed power distribution unit located in the same section is greater than zero, the difference is greater than or equal to the rated power of the variable load, and a sum of output power of all the at least one variable power supply units is greater than or equal to a sum of rated power of all the variable loads, the second trigger instruction is used to instruct the second load monitoring module to control the second selection module to preferably select, from the output voltage of the at least one fixed power distribution unit and the output voltage of the at least one variable power supply unit, the output voltage of the at least one fixed power distribution unit as the input voltage of the at least one variable configuration unit.

12. A power supply system, comprising:
an equipment room and a telecommunications equipment, wherein:
the telecommunications equipment comprises at least one fixed power distribution unit, at least one fixed configuration unit, at least one variable power supply unit, and at least one variable configuration unit, wherein;
a fixed power distribution unit of the at least one fixed power distribution unit is associated with a fixed configuration unit located in a same section and of the at least one fixed configuration unit, and an input end of each fixed configuration unit of the at least one fixed configuration unit is connected to an output end of a corresponding fixed power distribution unit of the at least one fixed power distribution unit; and output ends of all the at least one variable power supply units are connected, and an input end of each variable configuration unit of the at least one variable configuration unit is connected to an output end of the at least one variable power supply unit;
the at least one fixed power distribution unit is configured to transmit a power supply voltage to a corresponding fixed configuration unit located in the same section and of the at least one fixed power distribution unit;
the at least one fixed configuration unit comprises a first load power supply module and a fixed load, wherein the first load power supply module is configured to perform processing on a voltage that is output by the corresponding fixed power distribution unit, to obtain a voltage required for the fixed load to work normally, and input the voltage required for the fixed load to work normally to the fixed load; and the fixed load is a load that must be configured in the telecommunications equipment;
the at least one variable power supply unit is configured to convert a power supply voltage into a stable direct current voltage;
the at least one variable configuration unit comprises a second load power supply module and a variable load, wherein the second load power supply module is configured to perform processing on the direct current voltage that is output by the at least one variable power supply unit, to obtain a voltage required for the variable load to work normally, and input the voltage required for the variable load to work normally to the variable load; and the variable load is another load, other than the fixed load, that is configured in the telecommunications equipment; and
the equipment room is configured to input a power supply voltage to the telecommunications equipment.

13. A power supply implementation method, applied to a telecommunications equipment, wherein the telecommunications equipment comprises: at least one fixed power distribution unit, at least one fixed configuration unit, at least one variable power supply unit, and at least one variable configuration unit, wherein a fixed power distribution unit of the at least one fixed power distribution unit is corresponding to a fixed configuration unit located in a same section and of the at least one fixed configuration unit, and an input end of each fixed configuration unit of the at least one fixed configuration unit is connected to an output end of a corresponding fixed power distribution unit of the at least one fixed power distribution unit output ends of all the at least one variable power supply units are connected, and an input end of each variable configuration unit of the at least one variable configuration unit is connected to an output end of the at least one variable power supply unit; the at least one fixed configuration unit comprises a first load power supply module and a fixed load; and the at least one variable configuration unit comprises a second load power supply module and a variable load; and
the method comprises:
transmitting, by the fixed power distribution unit, a power supply voltage to a corresponding fixed configuration unit located in the same section and of the at least one fixed power distribution unit
performing, by the first load power supply module, processing on a voltage that is output by the corresponding fixed power distribution unit, to obtain a voltage required for the fixed load to work normally, and inputting the voltage required for the fixed load to work normally to the fixed load, wherein the fixed load is a load that must be configured in the telecommunications equipment;
converting, by the at least one variable power supply unit, a power supply voltage into a stable direct current voltage; and
performing, by the second load power supply module, processing on the direct current voltage that is output by the at least one variable power supply unit, to obtain a voltage required for the variable load to work normally, and inputting the voltage required for the variable load to work normally to the variable load, wherein the variable load is another load, other than the fixed load, that is configured in the telecommunications equipment.

14. The method according to claim 13, wherein the at least one fixed power distribution unit comprises two power distribution subunits, and each of the power distribution subunits comprises a first filtering protection module; and
the transmitting, by the at least one fixed power distribution unit, a power supply voltage to the corresponding fixed configuration unit located in the same section comprises:
performing, by the first filtering protection module, filtering protection processing on the power supply voltage, and transmitting a voltage after the processing to the corresponding fixed configuration unit located in the same section.

15. The method according to claim 14, wherein the power distribution subunit further comprises a first ORing module, wherein an input end of the first ORing module is connected to an output end of the first filtering protection module; and
when a voltage that is output by the first filtering protection module that belongs to the same power distribution subunit as the first ORing module meets a preset condition, the first ORing module connects a connection between the power distribution subunit and the input end of the corresponding fixed configuration unit located in the same section, to transmit the voltage that is output by the first filtering protection module that belongs to the same power distribution subunit as the first ORing module to the corresponding fixed configuration unit located in the same section, wherein:

the meeting a preset condition is that a difference between the output voltage of the first filtering protection module that belongs to the same power distribution subunit as the first ORing module and an output voltage of the first filtering protection module that does not belong to the same power distribution subunit as the first ORing module is greater than or equal to a preset threshold; and the preset threshold represents a critical value, which connects the connection between the power distribution subunit and the input end of the corresponding fixed configuration unit located in the same section, of the difference between the output voltage of the first filtering protection module that belongs to the power distribution subunit and the output voltage of the first filtering protection module that does not belong to the power distribution subunit.

16. The method according to claim 13, wherein the at least one variable power supply unit comprises two first power supply subunits, and each of the first power supply subunits comprises a second filtering protection module and a direct current converting module, wherein an output end of the second filtering protection module is connected to an input end of the direct current converting module, and an output end of the direct current converting module is an output end of the at least one variable power supply unit; and the converting, by the at least one variable power supply unit, a power supply voltage into a stable direct current voltage comprises:

performing, by the second filtering protection module, filtering protection processing on a power supply voltage input; and converting, by the direct current converting module, a voltage that is output by the second filtering protection module into a stable direct current voltage.

17. The method according to claim 13, wherein the at least one variable power supply unit comprises a first power supply subunit, and the first power supply subunit comprises a third filtering protection module, a second ORing module, and a direct current converting module, wherein an output end of the third filtering protection module is connected to an input end of the second ORing module, an output end of the second ORing module is connected to an input end of the direct current converting module, and an output end of the direct current converting module is an output end of the at least one variable power supply unit; and the converting, by the at least one variable power supply unit, a power supply voltage into a stable direct current voltage comprises:

performing, by the third filtering protection module, filtering protection processing on two power supply voltage inputs;

converting, by the second ORing module, two voltage inputs that are output by the third filtering protection module into one voltage input, and outputting the one voltage input; and converting, by the direct current converting module, a voltage that is output by the second ORing module into a stable direct current voltage.

18. The method according to claim 13, wherein the telecommunications equipment further comprises: a first power supply reporting module, a second power supply reporting module, and a centralized management unit; the at least one fixed configuration unit further comprises a first load monitoring module and a first selection module; and the at least one variable configuration unit further comprises a second load monitoring module, wherein an input end of the first selection module is separately connected to the output end of the at least one fixed power distribution unit and the output end of the at least one variable power supply unit, an output end of the first selection module is connected to an input end of the first load power supply module, and the first selection module is connected to the first load monitoring module; and the method further comprises:

acquiring, by the first power supply reporting module, output power of the at least one fixed power distribution unit, and reporting the output power of the at least one fixed power distribution unit to the centralized management unit;

acquiring, by the second power supply reporting module, output power of the at least one variable power supply unit, and reporting the output power of the at least one variable power supply unit to the centralized management unit;

monitoring, by the first load monitoring module, rated power of the fixed load, and reporting the rated power of the fixed load to the centralized management unit;

selecting, by the first selection module from an output voltage of the at least one fixed power distribution unit and an output voltage of the at least one variable power supply unit according to a control operation of the first load monitoring module, a voltage input as an input voltage of the at least one fixed configuration unit;

monitoring, by the second load monitoring module, rated power of the variable load, and reporting the rated power of the variable load to the centralized management unit; and determining, by the centralized management unit according to the output power of the at least one fixed power distribution unit, the output power of the at least one variable power supply unit, the rated power of the fixed load, and the rated power of the variable load, a first trigger instruction; and transmitting the first trigger instruction to the first load monitoring module, wherein the first trigger instruction is used to instruct the first load monitoring module to control the first selection module to select, from the output voltage of the at least one fixed power distribution unit and the output voltage of the at least one variable power supply unit, the output voltage of the at least one fixed power distribution unit or the output voltage of the at least one variable power supply unit as the input voltage of the at least one fixed configuration unit, wherein:

when there is a surplus of the output power of the at least one fixed power distribution unit, the first trigger instruction is used to instruct the first load monitoring module to control the first selection module to select the output voltage of the at least one fixed power distribution unit as the input voltage of the at least one fixed configuration unit; or when there is a surplus of the output power of the at least one variable power supply unit, the first trigger instruction is used to instruct the first load monitoring module to control the first selection module to select the output voltage of the at least one variable power supply unit as the input voltage of the at least one fixed configuration unit; or when there is a surplus of both the output power of the at least one fixed power distribution unit and the output power of the at least one variable power supply unit, the first trigger instruction is used to instruct the first load monitoring module to control the first selection module to preferably select the output voltage of the at least one fixed power distribution unit as the input voltage of the at least one fixed configuration unit.

19. The method according to claim 13, wherein the telecommunications equipment further comprises: a first power supply reporting module, a second power supply reporting module, and a centralized management unit; the at least one fixed configuration unit further comprises a first load monitoring module; and the at least one variable configuration unit further comprises a second load monitoring module and a second selection module, wherein an input end of the second selection module is separately connected to the output end of the at least one fixed power distribution unit and the output end of the at least one variable power supply unit, an output end of the second selection module is connected to an input end of the second load power supply module, and the second selection module is connected to the second load monitoring module; and the method further comprises:

acquiring, by the first power supply reporting module, output power of the at least one fixed power distribution unit, and reporting the output power of the at least one fixed power distribution unit to the centralized management unit;

acquiring, by the second power supply reporting module, output power of the at least one variable power supply unit, and reporting the output power of the at least one variable power supply unit to the centralized management unit;

monitoring, by the second load monitoring module, rated power of the variable load, and reporting the rated power of the variable load to the centralized management unit;

selecting, by the second selection module from an output voltage of the at least one fixed power distribution unit and an output voltage of the at least one variable power supply unit according to a control operation of the second load monitoring module, a voltage input as an input voltage of the at least one variable configuration unit;

monitoring, by the first load monitoring module, rated power of the fixed load, and reporting the rated power of the fixed load to the centralized management unit; and determining, by the centralized management unit according to the output power of the at least one fixed power distribution unit, the output power of the at least one variable power supply unit, the rated power of the fixed load, and the rated power of the variable load, a second trigger instruction, and transmitting the second trigger instruction to the second load monitoring module, wherein the second trigger instruction is used to instruct the second load monitoring module to control the second selection module to select, from the output voltage of the at least one fixed power distribution unit and the output voltage of the at least one variable power supply unit, the output voltage of the at least one fixed power distribution unit or the output voltage of the at least one variable power supply unit as the input voltage of the at least one variable configuration unit, wherein:

when there is a surplus of the output power of the at least one fixed power distribution unit, the second trigger instruction is used to instruct the second load monitoring module to control the second selection module to select the output voltage of the at least one fixed power distribution unit as the input voltage of the at least one variable configuration unit; or when there is a surplus of the output power of the at least one variable power supply unit, the second trigger instruction is used to instruct the second load monitoring module to control the second selection module to select the output voltage of the at least one variable power supply unit as the input voltage of the at least one variable configuration unit; or when there is a surplus of both the output power of the at least one fixed power distribution unit and the output power of the at least one variable power supply unit, the second trigger instruction is used to instruct the second load monitoring module to control the second selection module to preferably select the output voltage of the at least one fixed power distribution unit as the input voltage of the variable configuration unit.

\* \* \* \* \*